(12) United States Patent
Peterson

(10) Patent No.: US 6,825,626 B2
(45) Date of Patent: Nov. 30, 2004

(54) CURRENT SENSING METHODS AND APPARATUS IN AN APPLIANCE

(75) Inventor: Gregory A. Peterson, Barrington, IL (US)

(73) Assignee: Emerson Electric Co., St. Louis, MO (US)

(*) Notice: Subject to any disclaimer, the term of this patent is extended or adjusted under 35 U.S.C. 154(b) by 193 days.

(21) Appl. No.: 10/264,720

(22) Filed: Oct. 4, 2002

(65) Prior Publication Data

US 2003/0137263 A1 Jul. 24, 2003

Related U.S. Application Data

(60) Provisional application No. 60/351,348, filed on Jan. 24, 2002.

(51) Int. Cl.[7] .................................................. H02P 7/00
(52) U.S. Cl. ................. 318/434; 318/254; 310/DIG. 6; 361/748; 361/756; 361/761
(58) Field of Search ................................ 318/432, 434, 318/254; 361/748, 756, 761; 310/DIG. 6

(56) References Cited

U.S. PATENT DOCUMENTS

| | | | | |
|---|---|---|---|---|
| 4,317,176 A | * | 2/1982 | Saar et al. | .................. 700/168 |
| 4,724,346 A | * | 2/1988 | Klein et al. | ................ 310/67 R |
| 4,988,905 A | * | 1/1991 | Tolmie, Jr. | ................. 310/68 B |
| 5,038,088 A | * | 8/1991 | Arends et al. | .............. 318/565 |
| 5,359,273 A | | 10/1994 | Flückiger | |
| 5,689,168 A | | 11/1997 | Bogwicz et al. | |
| 5,912,541 A | * | 6/1999 | Bigler et al. | ................. 318/600 |
| 6,111,378 A | * | 8/2000 | LeMay et al. | ............... 318/443 |

FOREIGN PATENT DOCUMENTS

| EP | 0 394 177 | 10/1990 |
|---|---|---|
| GB | 2 343 996 | 5/2000 |

* cited by examiner

*Primary Examiner*—Rina Duda
(74) *Attorney, Agent, or Firm*—Maginot, Moore & Beck

(57) ABSTRACT

A motor control circuit includes a first winding switch, a first switch driver circuit, and a current sense circuit. The first winding switch has a control input and is operable to activate a first motor winding. The first switch driver circuit is coupled to the control input. The current sense circuit is operably coupled to a second winding. The current sense circuit includes a sense resistor, the sense resistor comprising an etched trace in a printed circuit board. The etched trace has a geometry defining a resistance of the sense resistor.

20 Claims, 10 Drawing Sheets

CURRENT SENSING METHODS AND APPARATUS IN AN APPLIANCE

This application claims the benefit of U.S. Provisional Patent Application Ser. No. 60/351,348, filed Jan. 24, 2002, which is incorporated herein by reference.

CROSS-REFERENCE

Cross reference is made to copending U.S. patent applications Ser. No. 40,264,785 entitled "Appliance Control Methods and Apparatus", by Gregory Peterson; and Ser. No. 10,264,888 entitled "Appliance Control Communication Methods and Apparatus", by Gregory Peterson.

FIELD OF THE INVENTION

The present invention relates generally to appliance devices, and more particular, to appliance devices having current sensor circuits.

BACKGROUND OF THE INVENTION

Appliance devices such as dishwashers, clothing washing machines, dryers, ovens, refrigerators and the like often include electrical control circuits. Such control circuits receive input from the user and control the operation of the appliance device based on the received input. In many cases, the overall operation of the appliance is predefined as a general matter and the user input merely modifies the predefined operation in some way. For example, the operation of a dishwasher typically involves the processes of filling, washing, draining and rinsing. Such operations involve, among other things, the control of water valves, detergent valves and motor relays. The general sequence of such operations is generally predefined. However, user input may be used to alter the sequence, or to define certain parameters of the sequence. For example, the user input may define whether the wash cycle is normal, light, or heavy. Although the general sequence does not necessarily change dependent upon wash cycle selection, the length of certain processes within the sequence does change.

In addition, appliance control circuits often receive input from sensor devices in the appliance. The sensors provide feedback pertaining to appliance operation. For example, a dishwasher or clothes washer may include a temperature sensor, which allows the control circuit to regulate the temperature of the water. Appliances that have motors, for example, dishwashers, clothes washers and clothes dryers, will often include a current sense circuit that is used to sense the current level within one or more windings of the motor. The control circuit may then use the sensed current level for a variety of purposes.

One use of the current level pertains to the timing of energizing windings within the motor. In particular, many appliance motors include multiple windings that may be independently energized and de-energized. One winding may be a run winding that is energized during the steady state operation of the motor. Another winding may be a start winding that is energized during the start up of the motor. It is known that more energy is required to bring a motor up to steady state speed from a dead stop than that which is required to operate the motor at a steady state speed. Accordingly, it is also known to use start windings in addition to the run winding to provide extra driving energy to the motor during start-up. Once the motor reaches steady state, the start winding is de-energized.

One issue that arises from the use of start windings on an appliance motor is determining when to de-energize the start winding. If the start winding is de-energized too early, then the current in the main or run winding may increase dramatically, and may lead to inefficient operation or even winding damage. If the start winding is not de-energized, then the overall efficiency of the motor decreases because the losses increase as a function of the overall winding length.

One known method of controlling the de-energization of the start winding is to sense the current in the main winding of the motor. The current on the main winding of the motor varies inversely as a function of time from start-up. In other words, upon start up, the winding current is high and upon reaching steady state, the winding current is relatively low. Thus, the current sensor is used to determine when the winding current is low enough to correspond to steady state operation of the motor. When the control circuit, which receives a sensor signal from the current sense circuit, determines that the winding current is at a level consistent with steady state operation of the motor, the control circuit de-energizes the start winding.

One drawback associated with the use of current sense circuits is that they typically employ large circuit elements that add weight, cost, and manufacturing complexity. Because of the relatively high magnitude of motor current, low weight and low cost microelectronic devices are typically insufficient because they have limited current handling capacity. Accordingly, motor current sense circuits involve larger and more costly discrete components. In one example, prior art devices have employed large, coiled wire current sensing resistors as the main element of the current sense circuit. Such current sensing resistors were costly to both manufacture and assemble onto the circuit board. Because profit margins on appliances are relatively small, there is always a need to avoid costly components and manufacturing steps.

SUMMARY OF THE INVENTION

The present invention addresses the above needs, as well as others, by providing an appliance control apparatus that incorporates a current sense resistor as a trace on printed circuit board. The use of a circuit board trace as a current sense resistor reduces manufacturing complexity because the current sense resistor is formed at the same time as the other printed circuit board traces. Moreover, the cost associated with procuring a separate, coiled wire resistor is avoided.

An embodiment that incorporates this aspect of the invention is a motor control circuit that includes a first winding switch, a first switch driver circuit, and a current sense circuit. The first winding switch has a control input and is operable to activate a first motor winding. The first switch driver circuit is coupled to the control input. The current sense circuit is operably coupled to a second winding. The current sense circuit includes a sense resistor, the sense resistor comprising an etched trace in a printed circuit board. The etched trace has a geometry defining a resistance of the sense resistor.

Another embodiment that incorporates the current sense resistor of the present invention is an appliance control circuit arrangement that includes a current sense circuit and a controller. The current sense circuit is operably coupled to a winding of an appliance motor. The current sense circuit includes a sense resistor, the sense resistor comprising an etched trace in a printed circuit board. The etched trace has a geometry defining a resistance of the sense resistor. The controller is operable to obtain current sense signals from the current sense circuit, and generate a first signal responsive to the current sense signals obtained from the current sense circuit.

The above described embodiment not only may be used in situations in which a start winding is used to bring a motor up to speed, but also any situation in which a device is controlled in relation to the current flowing through the motor windings.

The above described features and advantages, as well as others, will become more readily apparent to those of ordinary skill in the art by reference to the following detailed description and accompanying drawings.

DETAILED DESCRIPTION

Figure 1:
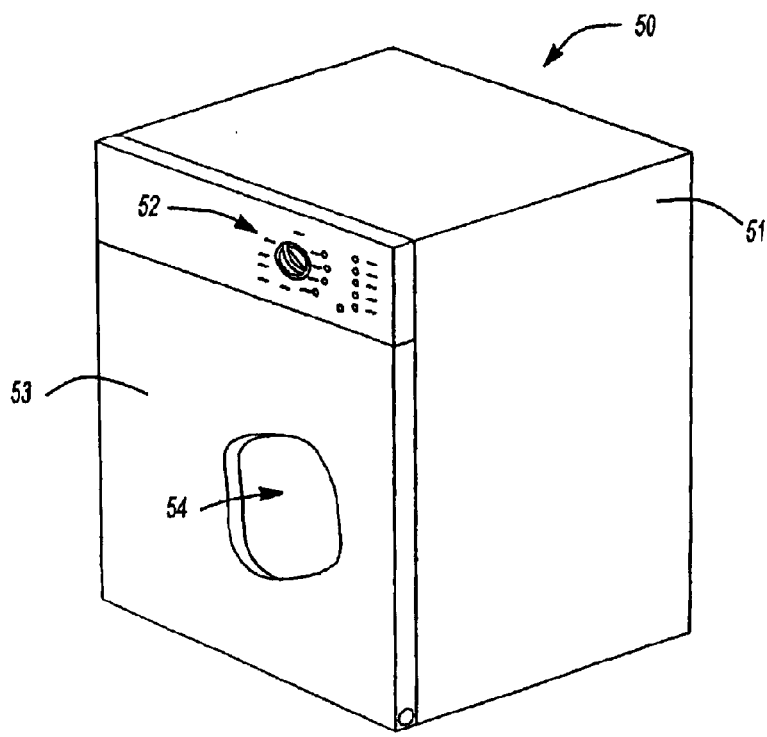
FIG. 1 shows a perspective, partially cutaway view of an exemplary dishwasher in which one or more features of the present invention may be incorporated.

FIG. 1 shows an exemplary embodiment of a dishwasher 50 in which one or more aspects of the present invention may be incorporated. The dishwasher 50 includes a frame 51, a control panel 52, a door 53, and a tub 54. The door 53 is pivotally attached to the frame 51. The door 53 and frame 51 define an enclosure in which is located the tub 54. The control panel 52 is affixed to the frame 51. The enclosure formed by the door 53 and the frame 51 also houses control circuits and devices as is known in the art. The exact physical arrangements of the door 53, frame 51 and tub 54 are a matter of design choice. For example, the control panel 52 may be mounted on the door 53 in some embodiments.

Figure 2:
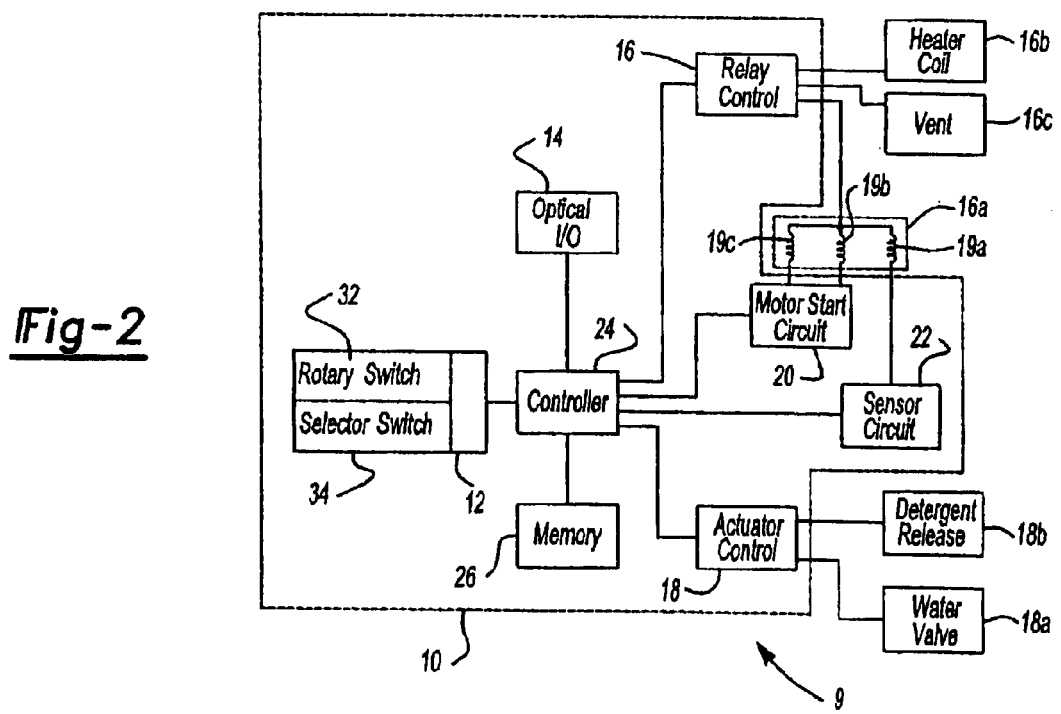
FIG. 2 shows a schematic block diagram of an exemplary appliance circuit that incorporates one or more features of the present invention.

FIG. 2 shows a schematic block diagram of an exemplary appliance circuit 9 that incorporates one or more features of the present invention. The appliance circuit 9 includes a control circuit 10 and a set of electromechanical devices. In the exemplary embodiment described herein, the electromechanical devices include a motor 16a, a heater coil 16b, a vent 16c, a water valve solenoid 18a, and a detergent release actuator 18b. Such electromechanical devices are arranged within the frame and/or tub of a dishwasher such as the dishwasher 50 of FIG. 1 with other mechanical devices such as pumps, rotating water sprayers, dish racks and the like as is well known in the art. The exact arrangement of the electromechanical devices and mechanical devices is a matter of design choice.

The appliance control circuit 10 controls the operation of one or more of the electromechanical devices as to carry out one or more appliance operations. In the exemplary embodiment described herein, the appliance control circuit 10 controls the operation of the devices that cooperate to perform dishwashing operations. However, it will be appreciated that the principles of the present invention may readily be adapted for use in clothes washing machines, clothes dryers, as well as other appliance devices.

The dishwasher control circuit 10 of FIG. 1 includes a switch input circuit 12, an optical input/output ("I/O") circuit 14, a relay control circuit 16, a valve control circuit 18, a motor start circuit 20, a sensor circuit 22, a controller 24, and a memory 26.

The switch input circuit 12 includes a rotating position switch 32 and a selector switch 34. In accordance with the present invention, the rotating position switch 34 has a first position associated with a first appliance function. For example, the first position may be a position in which a first washing cycle is selected from a plurality of possible washing cycles. In accordance with one aspect of the present invention, the rotating position switch 32 further includes a second position associated with a second appliance function, the second appliance function modifying the first appliance function. For example, the second position may select from one or more user options, such as delayed start, a forced air drying cycle, or the like. The selector switch 34 is a switch that may be manipulated to an actuated state. The selector switch 34 in the actuated state is configured to generate a signal representative of a selection of the first appliance function when the rotating position switch is in the first position. The selector switch 34 in the actuated state is further configured to generate a signal representative of a selection of the second appliance function when the rotating position switch is in the second position.

The rotating position switch 32 and the selector switch 34 may take a variety of forms. Exemplary embodiments of the rotating position switch 32 and the selector switch 34 are describe below in connection with FIG. 4. In general, however, the rotating position switch 32 includes a plurality of rotational positions in which user cycle selections may be identified by the user or operator, and the selector switch 34 is a device that actually causes an input signal based on the user selection to be communicated to the controller 24.

The optical I/O circuit 14 includes at least first and second optical communication devices, not shown in FIG. 2 (see, e.g., FIG. 9), that are in communication with an external surface of the appliance control panel. The first and second optical communication devices operable to communicate diagnostic information between the controller 24 and an external device. In preferred embodiments, the optical I/O circuit 14 further includes a plurality of indicator lights that communicate information regarding the operation of the dishwasher to the human operator. In accordance with one aspect of the present invention, at least one of the optical communication devices also operates as an indicator light that communicates information to a human operator.

The relay control circuit 16 is a circuit that is configured to control the status of various relay contacts in accordance with control signals received from the controller 24. The relays may operate to activate and deactivate various appliance mechanisms, for example, the motor 16a, the heater coil 16b, and the vent fan 16c. An exemplary relay control circuit 16 is shown in further detail in FIG. 8, discussed further below.

The actuator control circuit 18 is a circuit that is configured to control the operation of one or more actuators in the dishwasher in accordance with signals received from the controller 24. In the exemplary embodiment described herein, the actuator control circuit 18 is configured to control the operation of a water valve solenoid 18a, and a detergent release mechanism 18b. Further detail regarding an exemplary embodiment of the actuator control circuit 18 is provided below in connection with FIG. 8.

The motor start circuit 20 is a circuit that is configured to control the start windings 19b and 19c of the motor 16a. In accordance with one aspect of the present invention, the motor start circuit 20 includes a current sense circuit (discussed in further detail below in connection with FIG. 8) that is operably coupled to the run winding 19a of the appliance motor 16a. The current sense circuit includes a sense resistor that is formed as an etched trace in a printed circuit board. The etched trace has a geometry that defines a resistance of the sense resistor. The current sense circuit, among other things, provides a mechanism by which information regarding the motor winding current may be obtained. Such information may be used for many purposes. For example, the motor winding current information may be used by the controller 24 to determine when to activate and de-activate the start windings 19b and 19c in the motor 16a. However, as will be discussed below, the controller 24 may also use the information from the current sense circuit to adjust water levels.

The sensor circuit 22 is a circuit that is configured to provide to the controller 24 electrical signals representative of a sensed condition of the dishwasher operation. For example, the sensor circuit 22 in the exemplary embodiment described herein includes a temperature sensor, a soil sensor, and a motor current sensor. Further detail regarding the sensor circuit 22 is provided below in connection with FIGS. 8 and 10.

The controller 24 is a processor-based control circuit that is operable to provide control signals to the relay control circuit 16, actuator control circuit 18, and the motor start circuit 20, responsive to input signals received from the switch input circuit 12 and the sensor circuit 22. The controller 24 may suitably include a microprocessor, a microcontroller, and/or other digital and analog control circuitry as well as incidental circuitry associated therewith. The controller 24 is preferably configured to perform operations based on program instructions stored in the memory 26 and/or memory internal to the controller 24.

The memory 26 comprises one or more electronic memory devices which may suitably include a read only memory, a random access memory ("RAM"), an electronically erasable programmable read only memory ("EEPROM"), other types of memory, or a combination of any of the above. In a preferred embodiment, the memory 26 includes a programmable non-volatile memory, for example, an EEPROM. Among other things, the memory 26 stores a calibration factor associated with the current sense resistor of the motor start circuit 20.

In the general operation of the dishwasher control circuit 10, an operator typically provides as input a first input signal representative of a select cycle operation of the dishwasher via the switch input circuit 12. For example, the first input signal may be one that corresponds to a request for a full wash cycle. The operator may also provide as a second input via the switch input circuit 12 a second input signal representative of an operation modification option, such as, for example, an additional heated dry cycle, or a delayed start. Most appliances, including dishwashers, clothes washing machine, clothes dryers and the like have commonly featured a main cycle selection that may be modified by one or more separate option selections.

In any event, the controller 24 receives the first input signal and, if applicable, the second input signal, and commences a dishwashing operation accordingly. In a typical wash cycle, the general cycle is as follows: 1) water fill, 2) spray water, 3) release detergent, 4) spray water, 5) drain water, 6) water fill, 7) spray water, and 8) drain water. It will be appreciated that the above cycle may readily be modified or altered as is known in the art.

Figure 3:
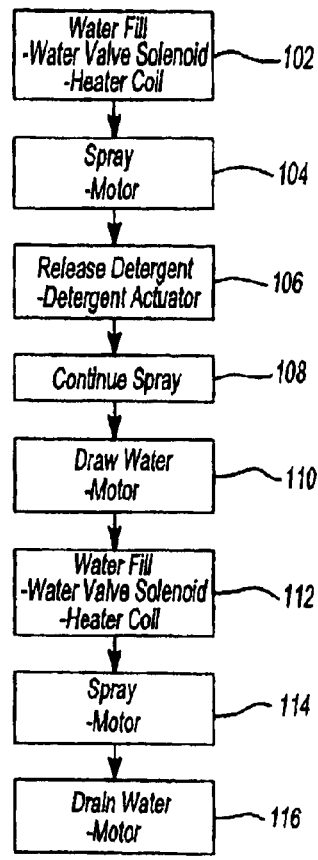
FIG. 3 shows a flow diagram of an exemplary set of operations performed by a controller of a dishwasher in accordance with the present invention.

FIG. 3 shows a flow diagram 100 of the exemplary set of operations performed by the controller 24 to effectuate a normal cycle operation of the dishwasher. It will be appreciated that the flow diagram 100 of FIG. 3 is given by way of example only, and that those of ordinary skill in the art may readily modify the flow diagram to suit their specific implementations. In addition, as discussed below in connection with FIG. 4, the operation of the flow diagram 100 may vary based on user input of cycle selection. Nevertheless, the flow diagram 100 illustrates the general operation of typical controller 24 of a dishwasher according to the invention.

In step 102, the controller 24 causes an initial water fill operation to take place. To this end, the controller 24 provides a signal to the actuator control circuit 18 that actuates the water valve solenoid 18a, thereby causing the water valve to open. The controller 24 further provides a signal to the relay control circuit 16 that energizes the heater coil 16b. The controller 24 then allows the water to fill for a predetermined amount of time. It is noted that the water pressure may be kept constant by a pressure sensitive valve, as is known in the art. Thus, the controller 24 effectively controls water the water level controlling the amount of time that the near constant flow of water is provided to the tub 54. The controller 24 also monitors, using sensor signals from the sensor circuit 22, the water temperature.

When the water level is adequate, then the controller 24 provides a signal to the actuator control circuit 18 that de-energizes the water valve solenoid 18a, thereby causing the water valve to close. When the water temperature is adequate, then the controller 24 provides a signal to the relay control circuit 16 that de-energizes the heater coil 16b.

In step 104, the controller causes a spray operation to occur. The spray operation is one in which the heated water within the dishwasher tub 54 is sprayed throughout the tub 54 onto the items to be cleaned. In step 104, the spray operation serves as a pre-rinse cycle. However, if detergent is place loosely in the tub, then the spray operation of step 104 rinses and cleans simultaneously. To effectuate the spray cycle, the controller 24 provides a signal to the relay control circuit 16 that causes the run winding 19a of the motor 16a to be energized. The motor 16a drives the pump, not shown, that causes the water to be sprayed throughout the tub 54.

The controller 24 further provides a signal to the motor start circuit 20 that causes one of the start windings 19b or 19c to be energized. As is known in the art, it is advantageous to employ a separate start winding to bring a motor up to speed, and then de-energize the start winding once the motor reaches operating speed. Thereafter, only the run winding is energized during steady-state operation of the motor. Thus, the controller 24 provides a signal to the motor start circuit 20 that causes the start winding to be de-energized when the motor 16a reaches steady state. The controller 24 monitors the current using the current sense circuit (described above in connection with FIG. 2) to determine when the motor 16a is in steady-state.

In step 106, which occurs after a predetermined time after the start of step 104, the controller 24 causes additional detergent to be released. As is known in the art, a separate detergent receptacle is disposed within the dishwasher that is released after the spraying cycle has begun. In the exemplary embodiment described herein, the controller 24 causes the release of additional detergent by providing a signal to the actuator control circuit 18 that causes a detergent release mechanism to open. It will be appreciated, however, that additional detergent may be released using purely mechanical means. It will further be appreciated that in some embodiments, step 106 may be preceded by separate drain, fill, and sprays step to remove the dirty water generated in the original spray step 104 from the tub 54.

Regardless of whether the water is exchanged prior to releasing detergent in step 106, the controller 24 continues the spray operation in step 108 to spray the water with the newly released detergent onto the items to be cleaned. The spray operation may suitably occur continuously from step 104 through step 108. In such a case, the controller 24 need not change the state of the motor relay or the motor start control circuit 20.

After a predetermined amount of time in steps 104 through 108, or at least step 108, the controller 24 proceeds to step 110 in which water is drained from the tub 54. To this end, the controller 24 provides a signal to the relay circuit 16 that opens the relay to de-energize the motor 16a. In the exemplary embodiment described herein, the controller 24 thereafter provides signals to the relay circuit 16 and the motor start circuit 20 that cause the pump motor 16a to rotate in a reverse direction. In the exemplary embodiment described herein, the reverse rotation of the motor causes the pump to operate in pumping water out of the tub 54, as is known in the art. However, in other embodiments, a separate motor and/or pump may be used to empty the tub 54. In any event, when a low water level is detected by the controller 24 through the sensor circuit 22, then the controller 24 causes the motor 16a to be de-energized. In the embodiment described herein, the low water level may suitably be detected using the motor run winding current sensed by the current sensor.

Steps 112 through 116 represent the rinse cycle of the dishwashing operation. In step 112, the controller 24 performs a water fill operation similar to that described above in connection with step 102. Thereafter, in step 114, the controller 24 performs the spray operation, similar to that of step 104. If a so-called rinse-aid receptacle is employed, the controller 24 may in step 114 provide a signal to the relay control device 16 that causes a rinse-aid release mechanism to open. In any event, after a predetermined duration of spraying in step 114, the controller 24 proceeds to step 116 to drain the water from the tub 54. To this end, step 116 may suitably be substantially the same as step 110.

As discussed above, the operations of the flow diagram 100 may vary somewhat from dishwasher to dishwasher. Moreover, within any particular dishwasher, the operations of the flow diagram 100 may be altered through user selection of particular cycles and options. However, regardless of variation in such operations, any appliance may readily obtain the benefits of the novel switch arrangement of the present invention by incorporating the rotating switch and selection switch in an environment in which the user is allowed to provide input that affects dishwasher operation.

In addition, the benefits of the current sense circuit of the present invention may be obtained by incorporating the sense resistor of the present invention in any appliance that employs current feedback to control the operation of the motor or some other device. Moreover, the benefits of external communication of one aspect of the present invention may be obtained by incorporating the first and second optical communication devices of the present invention in any household appliance that incorporates an electronic controller capable of effecting data communication. Indeed, a dishwasher or other appliance will be enhanced by incorporation of any of the above described benefits individually or in combination.

Figure 4:
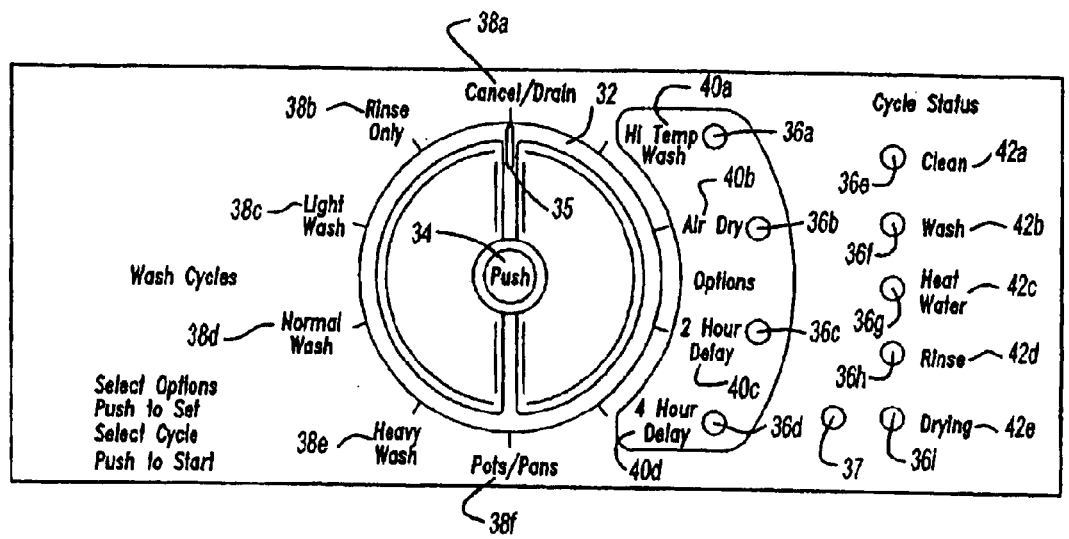
FIG. 4 shows a front view of an exemplary control panel for use in connection with the appliance circuit of FIG. 2.

FIG. 4 shows a front view of an exemplary control panel 52 for use in connection with the dishwasher control circuit 10 of FIG. 2. The control panel 52 is preferably located at a user-accessible portion of the dishwasher apparatus. The control panel 52 provides the interface through which an operator generates control input signals and through which information related to the operation of the dishwasher may be communicated to the user. To this end, the control panel 52 includes an exemplary embodiment of the rotating position switch 32, and an exemplary embodiment of the selection switch 34, and a plurality of indicator lights 36a through 36i.

As discussed above, the rotating position switch 32 and the selection switch 34 constitute a portion of the switch input circuit 12 of FIG. 2. The rotating position switch 32 is rotatably mounted to the dishwasher in a manner described in further detail below in connection with FIGS. 5 and 6. The rotating position switch 32 includes a position indicator 35 that defines a reference point for the annular (i.e. rotational) position of the rotating position switch 32.

Disposed around the rotating position switch 32 at distinct annular positions are cycle selection indicia 38a through 38f and option choice indicia 40a through 40d. Each of the indicator lights 36a through 36d is disposed adjacent to corresponding option choice indicia 40a through 40d.

As shown in FIG. 4, the exemplary cycle choice indicia include "Cancel/Drain" indicia 38a, "Rinse Only" indicia 38b, "Light Wash" indicia 38c, "Medium Wash" indicia 38d, "Heavy Wash" indicia 38e and "Pots/Pan" indicia 38f. Such indicia represent the available cycle selections. The operator or user selects a cycle by rotating the rotating position switch 32 until the position indicator 35 is aligned adjacent to the indicia 38x that corresponds to the type of washing cycle desired, where x is any of a through f. In the exemplary embodiment described herein, the operator further actuates the selector switch 34 to input the cycle selection to the controller 24.

In general, the user cycle selections associated with the indicia 38a through 38f are carried out by altering or adjusting the operations of the flow diagram 100 of FIG. 3. For example, selection of the "Heavy Wash", "Medium Wash" and "Light Wash" may vary the length of step 104 and/or step 108. In another example, the selection of "Rinse Only" may omit steps 102 through 110 entirely. The selection of "Drain/Cancel" causes immediate execution of step 116. It will be appreciated that the present invention is in no way limited to any particular number or type of cycle choices that are available to the operator. The cycle choices and how those choices are implemented by the controller 24. Moreover, other appliances such as clothes washers and dryers will necessarily have a different set of cycle choices.

After selecting a cycle choice as described above, the operator may subsequently select an optional operation by rotating the rotating position switch 32 until the position indicator 35 is aligned adjacent to the option choice indicia 40x that corresponds to the option desired, where x is any of a through d. As shown in FIG. 4, the exemplary option choice indicia include "Hi-Temp Wash" indicia 40a, "Air Dry" indicia 40b, "2 Hour Delay" indicia 40c, and "4 Hour Delay" indicia 40d. In the exemplary embodiment described herein, the operator further actuates the selector switch 34 to input the cycle selection to the controller 24.

In general, the user option selections associated with the indicia 40a through 40d are carried by the controller 24 in self-evident ways. For example, selection of the "Hi-Temp Wash" option could cause the controller 24 to adjust the temperature threshold at which it causes the heating coil 16b to be de-energized in step 102 of FIG. 3. In another example, selection of "Air Dry" causes the controller 24 to energize the vent 16c and/or the heating coil 16b after completion of step 116 of FIG. 2. The vent 16c and heating coil 16b help dry items located in the tub 54 after the water is drained out in step 116. The selection of "2 Hour Delay" and "4 Hour Delay" causes the controller 24 to delay the commencement of the operations identified in the flow diagram 100 of FIG. 2 until the corresponding delay has occurred. It will be appreciated that the exact option choices provided to the operator, and how those options are implemented by the controller 24, are largely a matter of design choice. Moreover, other types of appliances will necessarily have a different set of option choices.

Each of the indicator lights 36e through 36i is disposed adjacent to corresponding cycle status indicia 42a through 42e. The cycle status indicia include "Clean" 42a, "Wash" 42b, "Heat Water" 42c, "Rinse" 42d, and "Drying" 42e. In operation, the controller 24 energizes the indicator light 36e adjacent to the "Clean" indicia 42a upon completion of step 116 of FIG. 2. The controller 24 energizes the "Wash" indicia 42b during steps 104–110 of FIG. 2. The controller 24 energizes the "Heat Water" indicia 42c during steps 102 and 112 of FIG. 2. The controller 24 energizes the "Rinse" indicia 42d during steps 114 and 116 of FIG. 2. The controller 24 energizes the "Drying" indicia 42e during the optional air dry operation, discussed above.

Figure 5:
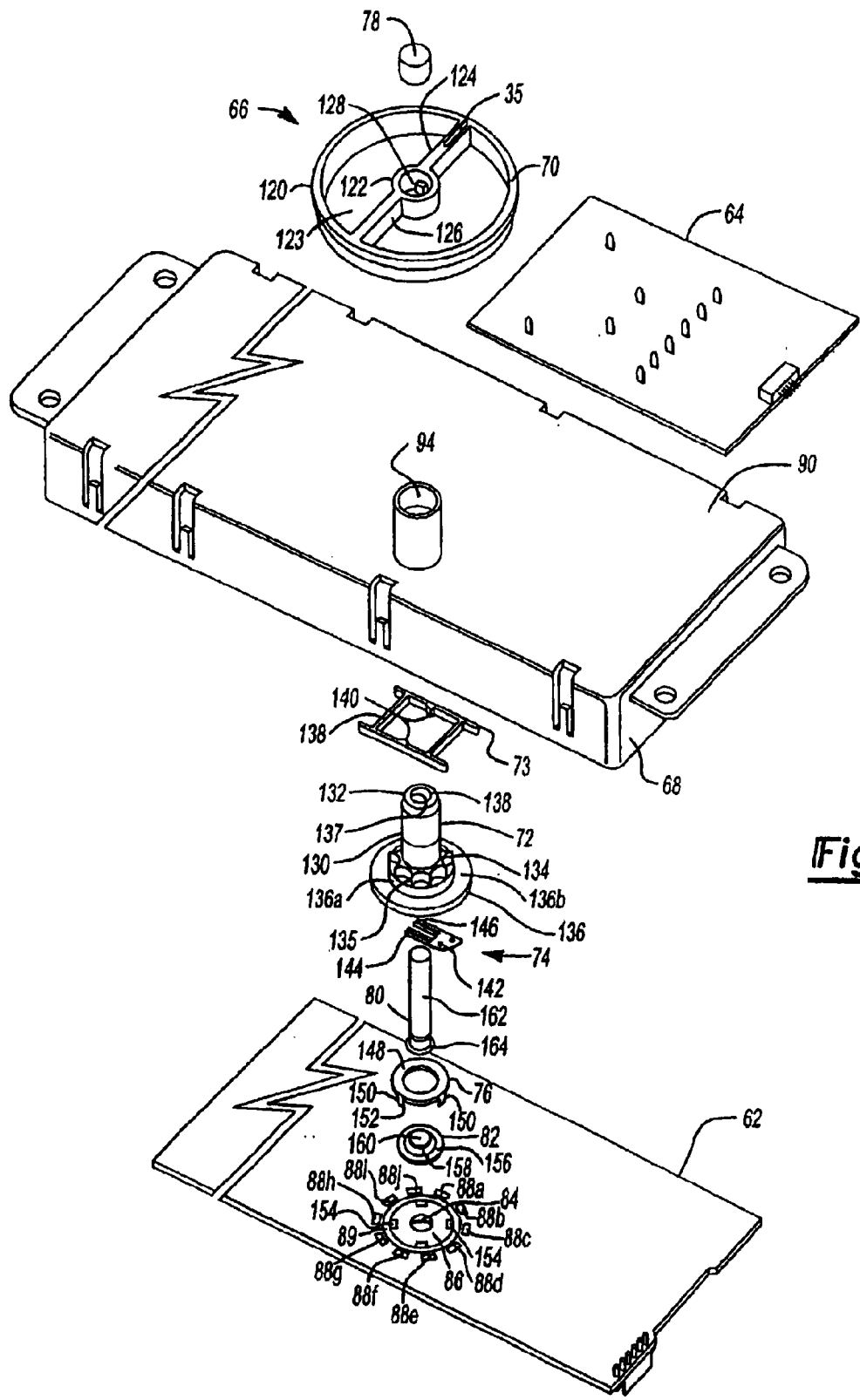
FIG. 5 shows an exploded perspective view of an exemplary control panel and circuit board that may be used in connection with the appliance circuit of FIG. 2.
Figure 6:
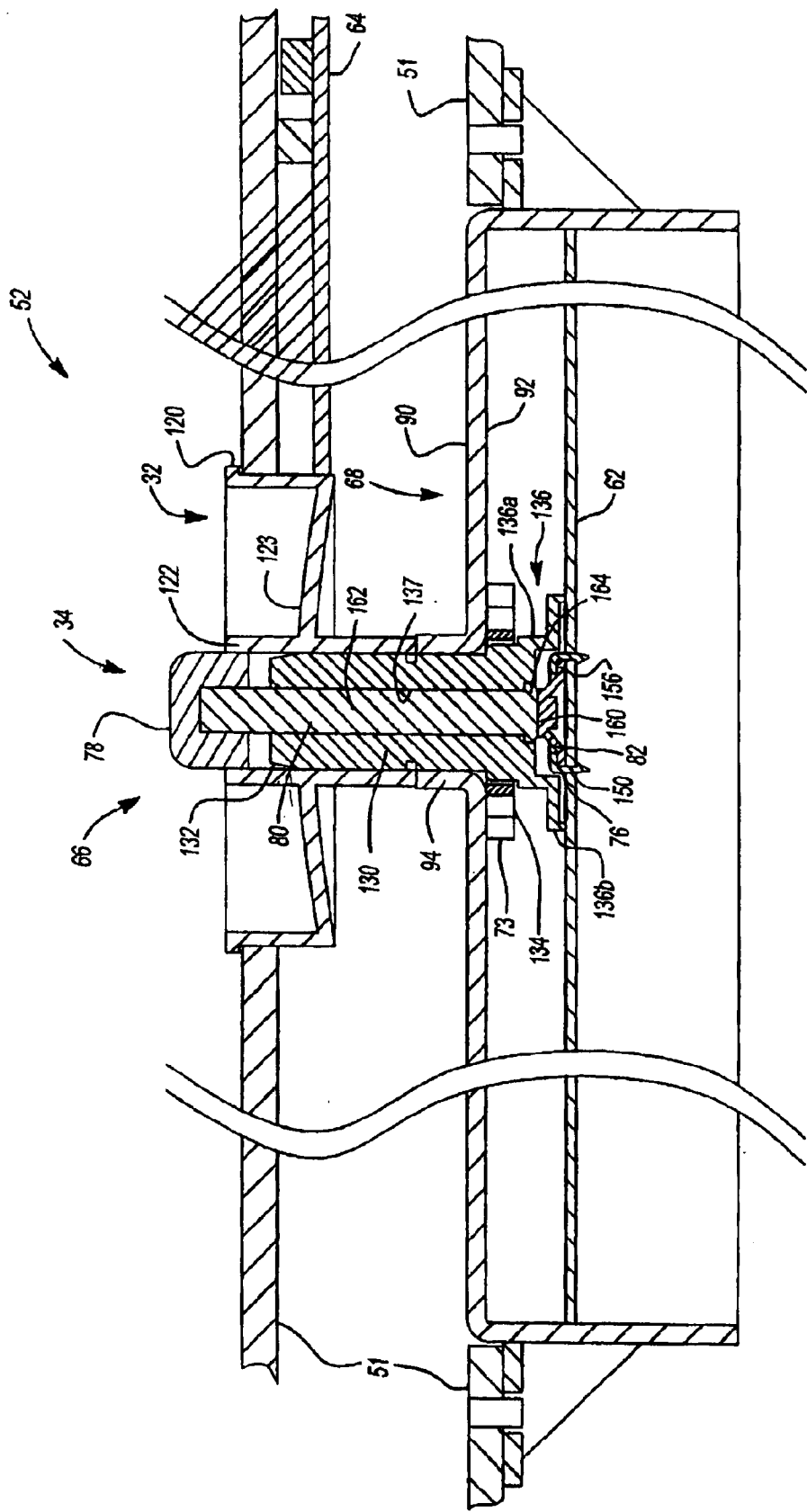
FIG. 6 show a cross sectional view of the control panel and circuit board of FIG. 5 assembled within a portion of a dishwasher frame.

FIGS. 5 and 6 show in further detail an exemplary mechanical configuration of the control panel 52 and the control circuit 10 into a portion of the dishwasher frame 51. FIG. 5 shows an exploded view of the control panel 52 apart from the dishwasher frame 51. FIG. 6 shows a fragmentary cross-section of the dishwasher frame 51 with the control panel 52 installed therein.

Referring to FIGS. 5 and 6 contemporaneously, the control panel 52 includes a primary printed circuit board ("PCB") 62, a secondary PCB 64, a dual switch assembly 66, and housing 68. The primary PCB 62 and the secondary PCB 64 contain the control circuit 10 (see FIG. 1). The dual switch assembly 66 includes components of both the selector switch 34 and the rotating position switch 32. The rotating position switch 32 includes a rotatable handle 70, a rotating shaft 72, a tactile feedback member 73, a conductive cam 74, and a spacer 76. The selector switch 34 includes a pushbutton 78, an axial displacement shaft 80, and an elastomeric spring contact member 82. The primary PCB 62 further includes first and second selector contacts 84 and 86, respectively, annular position contacts 88a through 88j, and an annular continuous contact 89.

The rotatable handle 70 comprises substantially circular outer ring 120 and a substantially circular inner ring 122. A disk-like bottom surface 123 extends from the bottom edge of the inner ring 122 to the bottom edge of the outer ring 120. Two radial members 124 and 126 extend axially upward from the bottom surface 123 and extend radially in opposite directions from the inner ring 122 to the outer ring 120. The position indicator 35 (see also FIG. 3) is disposed on the radial member 124. Within the inner ring 122 is a detent 128 that chords off a portion of the inner ring 122. The rotatable handle 70 is disposed above a first side 90 of the housing 68.

The rotating shaft 72 includes an elongate shaft 130, a top ring 132, a tooth ring 134, a base 136, and a hollow interior 137. The hollow interior 137 extends axially along the entire length of the rotating shaft 72. The top ring 132 has diameter configured to fit within the inner ring 122 of the rotatable handle 70. To this end, the top ring 132 includes a chorded outer surface region 138 configured to allow the top ring 132 to fit within the portion of the inner ring 122 that includes the detent 128. The top ring 132 is also, except for the chorded region 138, preferably slightly frustoconical in shape, tapering slightly inward from bottom to top. (See FIG. 6).

The elongate shaft 130 extends axially downward from the top ring 132 and has a diameter that is less than the inner diameter of the inner ring 122. The tooth ring 134 is disposed axially below the elongate shaft and has a radius generally exceeding that of the elongate shaft 130 and the inner ring 122. The tooth ring 134 includes a plurality of teeth 135 formed by slight radial concavities disposed at annular positions corresponding to the rotational contacts 88a through 88i. In particular, each pair of adjacent teeth 135 are separated by a concavity.

The base 136 includes a first hollow ring 136a and a second hollow ring 136b. The first hollow ring 136a is disposed directly below the tooth ring 134 and has an outer radius slightly exceeding the radius of the tooth ring 134. The second hollow ring 136b is disposed directly below the first hollow ring 136a and has an outer radius exceeding that of the first hollow ring 136a.

In general, the elongate shaft 130 extends through an opening 94 in the housing 68 such that the top ring 132 (and rotatable handle 70) is (are) located above the first surface 90 of the housing 68 and the tooth ring 134 and base 136 are located below a second surface 92 of the housing 68.

The tactile feedback member 73 includes an open rectangular frame 138 having length and width dimensions generally exceeding the radius of the tooth ring 134 but generally less than the second hollow ring 136b of the base 136. Disposed on two inner edges of the frame 138 are detents 140. The detents 140 have dimensions configured such that each may be received by any of the concavities between the teeth 135 of the tooth ring 134. The frame 138 is generally disposed around the tooth ring 134, trapped in an axial position between the second surface 92 of the housing 68 and the base 136. The frame 138 is preferably at least in part elastically deformable such that manual rotational force applied to the rotating shaft 72 causes the teeth 135 to overcome and traverse the detents 140.

The conductive cam 74 includes an anchor 142, a first cam contact 144 and a second cam contact 146. The anchor 142 is secured to the base 136 of the rotating shaft 72, and more particularly, within the second hollow ring 136b of the base 136. The first cam contact 144 extends in a tangential direction (with respect to the rotating elements of rotating shaft 72) from the anchor 142, and is also slightly inclined to extend axially downward from the base 142. The first cam contact 144 is disposed at a radial position aligned with the radial position of the rotational position contacts 88a through 88j of the primary PCB 62. The second cam contact 146 is disposed radially spaced apart from the first cam contact 144 but otherwise extends from the anchor 142 in a similar manner. The second cam contact 144 is disposed at a radial position aligned with the radial position of the continuous contact 89 of the primary PCB 62.

The spacer 76 includes an arched ring structure 148 that arches axially downward moving radially outward from the inner edge of the ring structure 148. Thus, the ring structure 148 extends from a substantially flat, radial extending surface near its inner edge, to a substantially vertical, axially extending surface near its outer edge. The spacer 76 further includes a plurality of axially extending legs 150, each having a retention barb 152 disposed thereon, The plurality of legs 150 are received by corresponding holes 154 in the primary PCB 62 and are retained within the holes 154 by engagement of the retention barbs 152 against the opposite surface of the PCB 62. The ring structure 148 has an outer diameter that is configured to fit within the first hollow ring 136a as shown in FIG. 6.

The pushbutton 78 is in the general shape of a cap that is slidably received into the inner ring 122 of the rotatable handle 70. The pushbutton is 78 secured to the axial displacement shaft 80. The pushbutton 78 has an outer radius that exceeds an inner radius of the top ring 132 of the rotating shaft 72, thereby defining the axial limit of downward travel of the pushbutton 78.

The elastomeric spring contact member 82 includes a base ring 156, a frustoconical spring portion 158, and a contact/button member 160. The base ring 156 has a radius configured to fit within and be trapped by the arched ring structure 148, as shown in FIG. 6. The frustoconical spring portion 158 extends radially inward and axially upward from the base ring 156 and terminates in the contact/button member 160. The contact button member 160 extends axially outward from, but is disposed radially within, the arched ring structure 148. The contact/button member 160 includes a conductive contact such as carbon or the like, not shown, on its underside, which is configured to contact the first and second conductive contacts 84 and 86 when the spring contact member 82 is in a compressed or actuated state. In an alternative embodiment, the spring contact member may be formed of a conductive metal or another type of nonconductive material that includes conductive contacts.

The axial displacement shaft 80 includes an elongate member 162 and a bottom flange 164. The axial displacement shaft 80 extends in an elongate manner from the pushbutton 78 to the contact button member 160. To this end, the elongate member 162 is slidably disposed within the hollow interior 137 of the rotating shaft 72. The bottom flange 164 has a radius exceeding that of the hollow interior 137, thereby limiting the axially upward movement of the axial displacement shaft 80.

The dual switch assembly 66 effectively permits two basic operations, rotational movement of the rotating position switch 32 to allow the user to align the position indicator 35 with a select cycle choice or option choice (See FIG. 4), and actuation of the selector switch 34 to "enter" the selected cycle or option choice into the controller 24 of the control circuit 10.

An operator performs rotational movement by grasping the rotatable handle 70 and applying rotational force. The rotational force of the handle 70 translates to the rotating shaft 72 through the engagement of the detent 128 of the rotatable handle 70 with the chorded region 138 of the rotating shaft 72. The rotational movement of the rotating shaft 72 causes the teeth 135 to traverse the detents 140 of the tactile feedback member 73. In particular, the rotational force causes the teeth 135 adjacent to the detents 140 to push against the detents 140. The force against the detents 140 is relieved through outward flexing of the rectangular frame 138. As each of the teeth 135 passes the detents 140, the elastic nature of the rectangular frame 138 causes the rectangular frame to "snap" back, such that the detents 140 are received into the next concavity (between the teeth 135) of the tooth ring 134. This flexing and snapping as the teeth 135 rotate past the detents 140 provide tactile and preferably audible feedback to the user, and further assist the user in aligning the rotating position switch 32 into discrete annular positions that correspond to the contacts 88a through 88j. It is noted that rotational movement of the rotating shaft 72 also rotates the cam contact 74.

When the user aligns the position indicator 35 with the indicia associated with the desired cycle or option choice (See FIG. 4), then the user stops applying rotational force. When the rotational force is removed, the tactile feedback member 73 further perfects the alignment of the rotating position switch 32 through the operation of the elastic properties described above. In the final annular position, the first cam contact 144 is in direct electrical contact with the contact 88x, wherein x is one of a through j, that corresponds to the user's selection. In all positions, the second cam contact 146 is in direct electrical contact with the continuous contact 89. Because the first cam contact 144, the second cam contact 146, and the anchor 142 form a continuous conductor, the conductive cam 74 electrically connects the contact 88x to the continuous conductor 89. As will be discussed below, such connection creates a unique signal that recognized by the controller 24 as corresponding to the user's selection.

Thus, rotation of the rotating position switch 32 to one of its annular positions effectively creates a unique signal recognized by the controller 24 that is indicative of a user selection. The controller 24 may then perform operations corresponding to the user selection based on the recognition of the unique signal associated with the contact 88x.

However, in accordance with one aspect of the present invention, the unique signal that conveys the user cycle selection information to the controller 24 is not recognized or acted upon until the selector switch 34 is actuated. Thus, merely aligning the rotating position switch 32 with a desired cycle or option selection will not necessarily cause the controller 24 to carry out the desired operations. The selection must by "entered" by actuating the selector switch 34.

To actuate the selector switch 34 in the embodiment described herein, the user depresses the pushbutton 78, thereby causing axial movement thereof. Axial movement of the pushbutton 78 causes like axial movement of the axial displacement shaft 80. The axial movement of the axial displacement shaft 80 in turn applies axial force to the contact/button 160. The axial force of the contact/button 160 causes the frustoconical spring portion 158 to elastically compress, thereby allowing downward axial movement of the contact/button 160 to the first and second conductive contacts 84 and 86. The conductor on the underside of the contact/button 160 electrically connects the contacts 84 and 86. When the contacts 84 and 86 are connected, a signal is provided to the controller 24 that causes the controller 24 to receive, recognize, or process the unique signal created by the electrical connection between the select contact 88x with the continuous contact 89 by the rotating position switch. The controller 24 thereafter performs operations based on the user selection as described above in connection with FIGS. 3 and 4.

Figure 7:
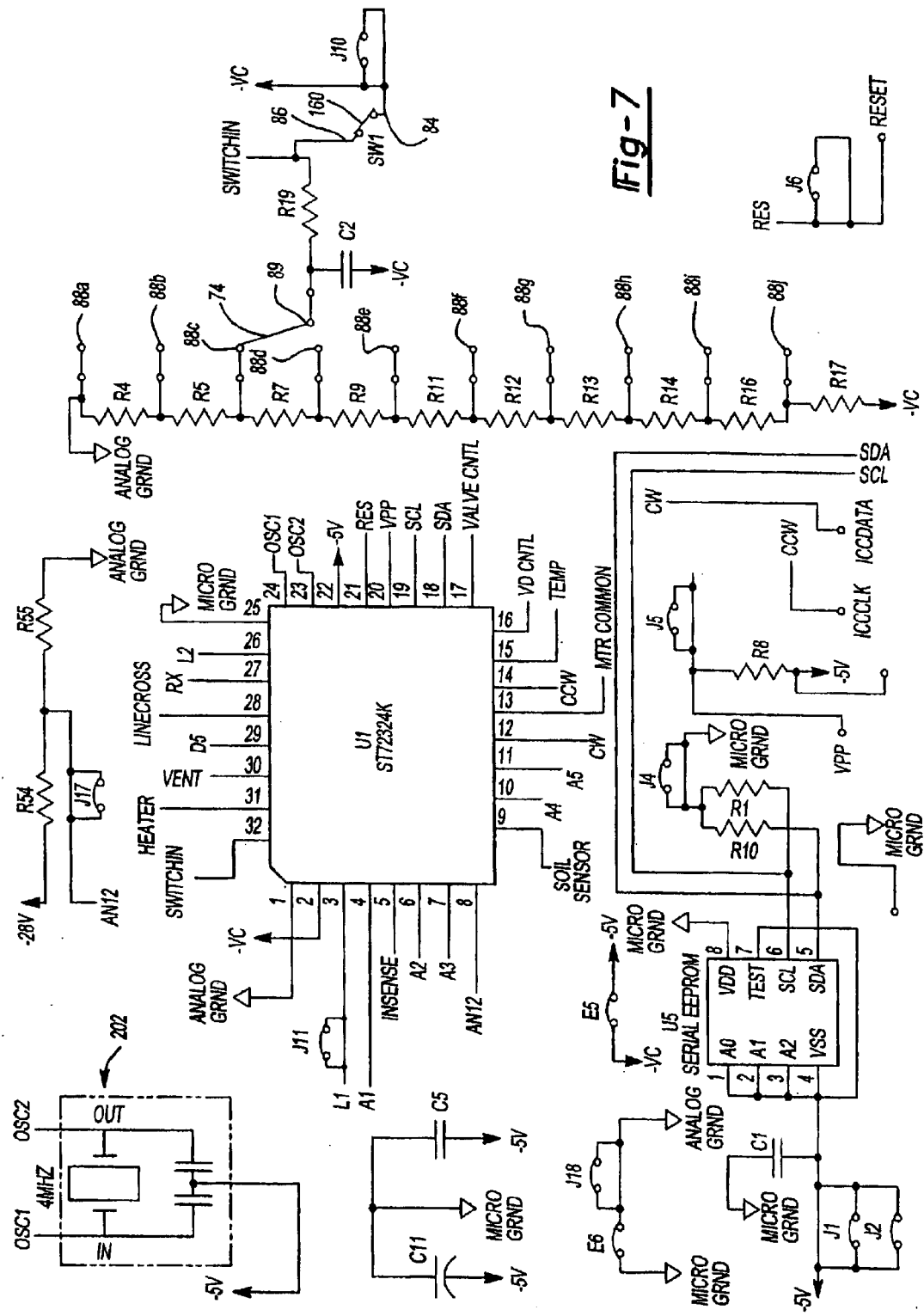
FIGS. 7, 8 and 9 show a schematic diagram of an exemplary control circuit which may be employed as the control circuit of the appliance circuit of FIG. 2.
Figure 8:
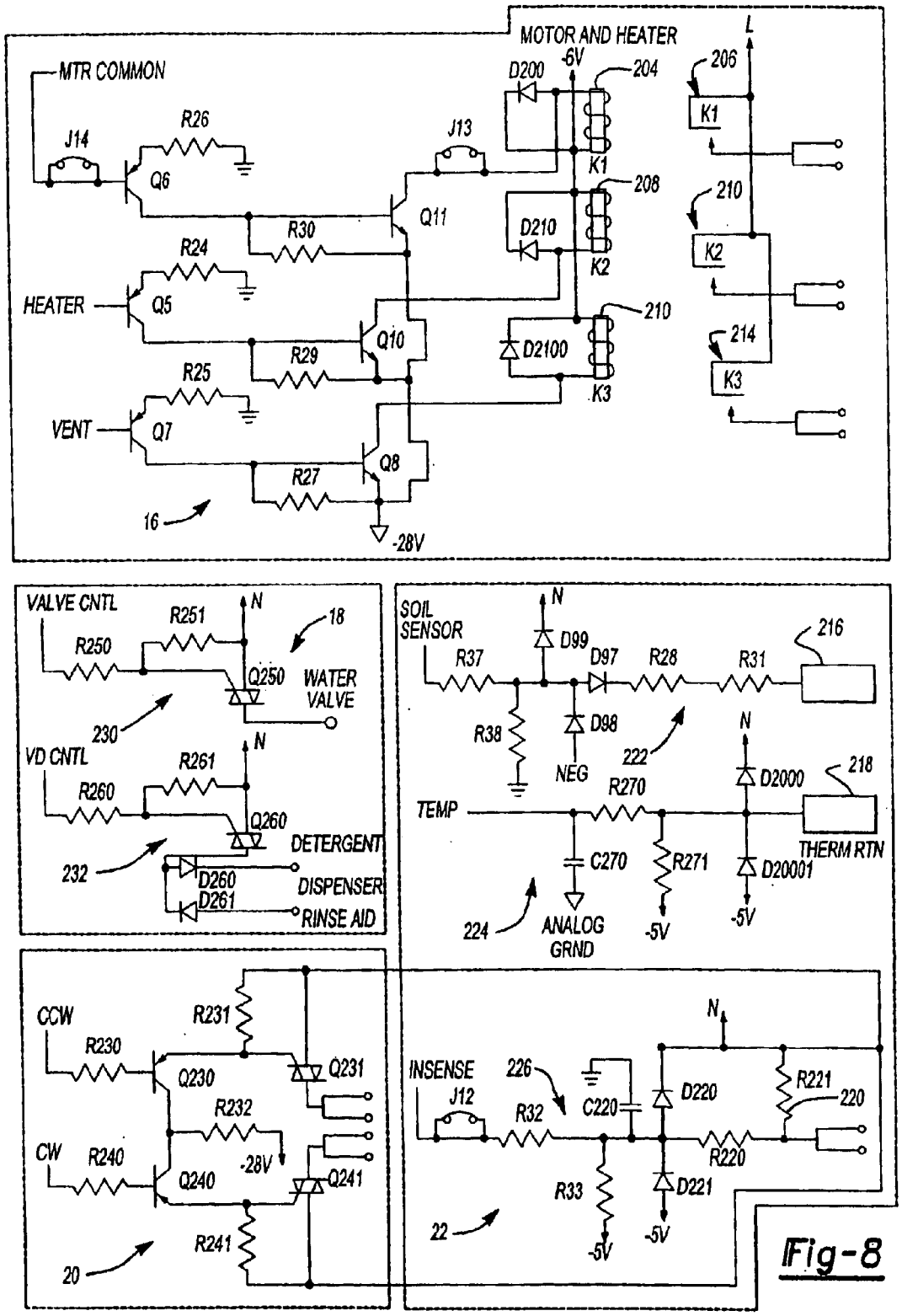
Figure 9:
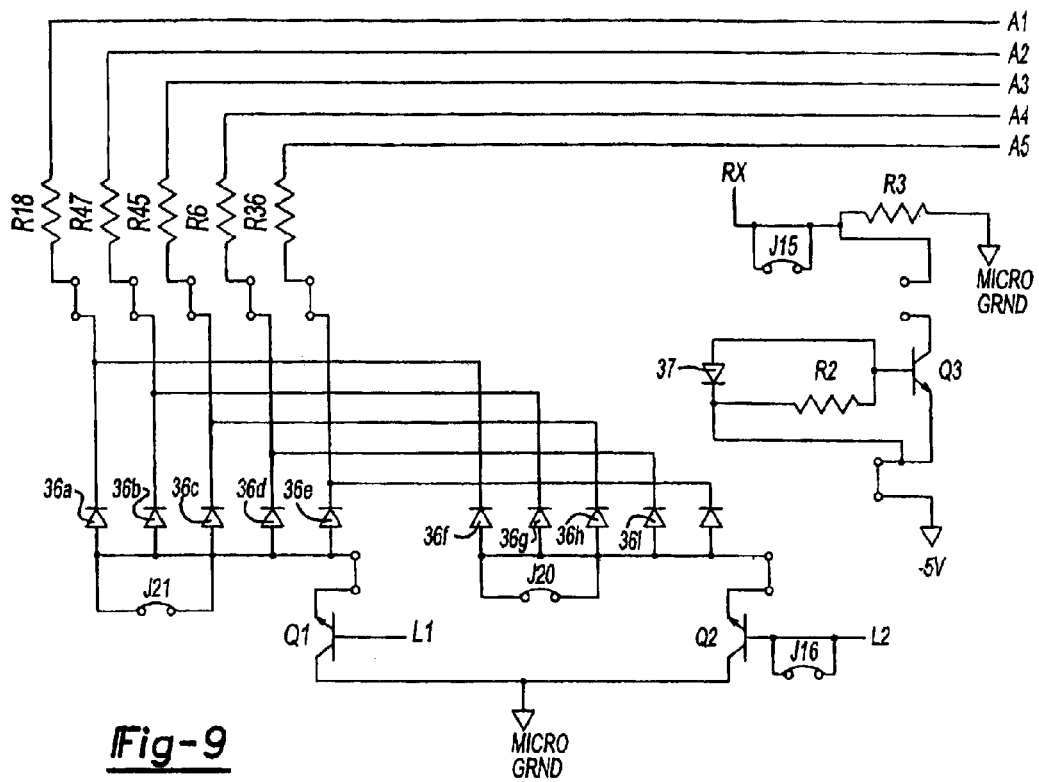

FIGS. 7, 8 and 9 show collectively a schematic diagram of an exemplary embodiment of the control circuit 10 of FIG. 2. FIG. 7 shows a portion of a schematic diagram of an exemplary embodiment of the control circuit 10 of FIG. 2 that includes the controller 24 and elements of the dual switch assembly 66 of FIGS. 5 and 6. FIG. 8 shows a portion of the control circuit 10 that includes the relay control circuit 16, the actuator control circuit 18 and the sensor circuit 22. FIG. 9 shows the optical I/O circuit 14.

Referring to FIG. 7, the controller 24 in the exemplary embodiment of FIG. 7 includes a microcontroller U1 that is operable to receive scaled analog inputs as well as receive and generate digital signals. Such devices are known in the art. In the exemplary embodiment described herein, the microcontroller U1 is the commercially available SG Thomson ST72324K. Supporting circuitry for the microcontroller U1 include a crystal oscillator circuit 202. It will be appreciated that the controller 24 could alternatively take other forms, such as a microprocessor having one or more analog-to-digital converters connected thereto for the receipt of analog signals. An EEPROM U5 is serially connected to the microcontroller U1 and is configured to store calibration information, diagnostic data, and other data as necessary.

The switch input circuit 12 in the embodiment of FIG. 7 includes a plurality of series connected resistors R4, R5, R7, R9, R11, R12, R13, R14, R16 and R17, the contacts 88a through 88j, the conductive cam 74, the continuous contact 89, a filter capacitor C2, a filter resistor R19, contacts 84 and 86, and button/contact 160.

The resistors R4, R5, R7, R9, R11, R12, R13, R14, R16 and R17 are series connected between ground and a bias voltage −VC. The contact 88a is electrically connected between the resistor R4 and ground. Each of the remaining contacts 88b through 88j are connected between adjacent pairs of the resistors R4, R5, R7, R9, R11, R12, R13, R14, R16 and R17. The continuous contact 89 is electrically connected through the filter formed by the capacitor C2 and resistor R19 to the contact 86. The contact 84 is coupled to ground.

From the above description, those of ordinary skill in the art will recognize that the resistors R4, R5, R7, R9, R11, R12, R13, R14, R16 and R17 form a ten stage voltage divider or voltage ladder. As a result, each of the contacts 88a through 88j carries a unique voltage level defined by its position on the voltage ladder. In the exemplary embodiment described herein, the resistors R4, R5, R7, R9, R11, R12, R13, R14, R16 and R17 all have the same resistance value. As a result, the voltage drop across each of the resistors R4, R5, R7, R9, R11, R12, R13, R14, R16 and R17 is the same. For example, if the voltage −VC is equal to −10 volts, then the voltage drop across each of the resistors R4, R5, R7, R9, R11, R12, R13, R14, R16 and R17 would be 1 volt. In such an example the resulting voltage levels at each of the contacts 88a through 88j would be as set forth below in Table 1:

TABLE 1

| Contact | Voltage |
| --- | --- |
| 88a | 0 V |
| 88b | −1 V |
| 88c | −2 V |
| 88d | −3 V |
| 88e | −4 V |
| 88f | −5 V |
| 88g | −6 V |
| 88h | −7 V |
| 88i | −8 V |
| 88j | −9 V |

As discussed above in connection with FIGS. 5 and 6, the conductive cam 74 is operable to selectively couple the continuous contact 89 with any of the contacts 88a through 88j. In FIG. 7, the conductive cam 74 is shown in an exemplary position connecting the continuous contact 89 with the contact 88c. As a result, the voltage on the continuous contact 89 is equal to the voltage at the contact 88c. This voltage propagates to the microcontroller U1 through the SWITCHIN input, which is coupled between the resistor R19 and the contact 86.

As discussed above, the microcontroller U1 does not automatically act upon the voltage from the continuous contact 89. Instead, the microcontroller U1 must receive a trigger signal via the selector switch 34 before responding to the voltage level on the continuous contact 89. To this end, when the button/contact 160 is actuated and thus contacts 84 and 86 are electrically connected, then the microcontroller input SWITCHIN is shorted to −VC. The microcontroller U1 is configured to recognize the −VC voltage as a trigger to receive input based on the position of the conductive cam 74.

In particular, in accordance with the example illustrated in FIG. 7, when the button/contact 160 is in its normally open position (un-actuated), the voltage at SWITCHIN is equal to the voltage at the contact 88c. The microcontroller U1 does not, however, perform actions responsive to the voltage at SWITCHIN. Thus, movement of the rotating position switch 32 and the resulting movement of the conductive cam 74 to another contact 88x will change the voltage at SWITCHIN but will not alter operations of the microcontroller U1.

However, if the microcontroller U1 detects −VC at SWITCHIN, then it will wait until the −VC voltage is removed from SWITCHIN, read the steady state voltage at SWITCHIN, and then perform a set of operations based on the steady state voltage. Thus, when the selector switch 34 is actuated, the microcontroller U1 detects −VC at SWITCHIN and then waits for the subsequent voltage. As the selector switch 34 is released, −VC is no longer connected to SWITCHIN. Instead, the voltage from the contact 88x at which the conductive cam 74 is positioned returns to SWITCHIN. The voltage from the contact 88x thus constitutes the subsequent voltage detected by the microcontroller U1. The microcontroller U1 then performs operations associated with the user cycle or option selection that corresponds with the position of the contact 88x.

In summary, as discussed above in connection with FIGS. 5 and 6, the user selection is communicated via the annular position of the rotating position switch 32 through the annular positioning of the contacts 88a through 88j. The contacts 88a through 88j each provide a unique voltage level to the microcontroller U1 because they are connected to discrete positions of a multi-stage voltage ladder circuit. Thus, the voltage level detected by the microcontroller U1 corresponds uniquely to an annular position selected by the user.

In addition, the microcontroller U1 only reads the ladder voltage upon receipt of a unique activation signal, the voltage level -VC, which results from the actuation of the selector switch 34.

It will be appreciated that other electrical circuits may readily be employed to convey position information to the microcontroller U1. For example, the discrete contacts 88a through 88j may be replaced with a single rheostat that also forms a voltage divider that provides a voltage level to the microcontroller based on annular position. In still another embodiment, each position contact 88a through 88j may simply be connected to a different input of the microcontroller U1, or to a multiplexor that provides a four digit binary code to the microcontroller U1. While these and other alternatives are viable and still obtain many of the benefits of the present invention, the embodiment disclosed herein provides additional advantages because it requires minimal inputs to the microcontroller U1 and it can achieve more reliable input value separation than typical rheostats. One alternative that only requires one additional microcontroller input is an alternative in which the contacts 84 and 86 provide a signal to a separate microcontroller input, as opposed to the same input to which the ladder voltage is provided.

FIG. 8 shows an exemplary schematic of the portion of the control circuit 10 that includes the relay control circuit 16, the actuator control circuit 18, the motor start circuit 20, and the sensor circuit 22. The relay control circuit 16 includes a motor relay K1, a heater relay K2, and a vent relay K3. The motor relay K1 includes a coil 204 and a set of contacts 206, the heater relay K2 includes a coil 208 and a set of contacts 210, and the vent relay K3 includes a coil 212 and a set of contacts 214. The motor relay contacts 206 are operably coupled to selectively and controllably complete the circuit through the run winding 19a of the motor. (See FIG. 2). The heater relay contacts 210 are operably coupled to selectively and controllably complete the circuit through the heater coil 16b. (See FIG. 2). The vent relay contacts 214 are operably coupled to selectively and controllably complete the circuit through the vent 16c. (See FIG. 2).

The motor relay coil 204 is operably coupled to a MTR COMMON output of the microcontroller U1 (see also FIG. 7) through a pair of driver transistors Q6 and Q11. The heater relay coil 208 is operably coupled to a HEATER output of the microcontroller U1 (see also FIG. 7) through a pair of driver transistors Q5 and Q10. The vent relay coil 212 is operably coupled to a VENT output of the microcontroller U1 (see also FIG. 7) through a pair of driver transistors Q7 and Q8.

Accordingly, when during the operations of the dishwasher (see FIGS. 3 and 4) the microcontroller U1 is required to turn on the motor 16a, the microcontroller U1 provides an activation signal to its MTR COMMON output. The activation signal is amplified through the driver resistors Q6 and Q11. The amplified activation signal energizes the motor relay coil 204, thereby causing the motor relay contacts 206 to close. Closure of the motor relay contacts 206 allows motor drive current to flow through the run winding 19a of the motor 16a. However, when the motor 16a first begins to run, one of the start windings 19b or 19c may also be energized as will be discussed further below in connection with the motor start circuit 20.

Similarly, when during the operations of the dishwasher (see FIGS. 2 and 3) the microcontroller U1 is required to energize the heater coil 16b, the microcontroller U1 provides an activation signal to its HEATER output. The activation signal is amplified through the driver resistors Q5 and Q10. The amplified activation signal energizes the heater relay coil 208, thereby causing the heater relay contacts 210 to close. Closure of the heater relay contacts 210 allows current to flow through the heater coil 16b, thereby generating heat.

Likewise, when during the operations of the dishwasher (see FIGS. 2 and 3) the microcontroller U1 is required to energize the vent 16c, the microcontroller U1 provides an activation signal to its VENT output. In the exemplary embodiment described herein, the vent 16c may be used during execution of the optional "Air Dry" operation after step 116 of FIG. 2. In any event, the vent activation signal is amplified through the driver resistors Q7 and Q8. The amplified activation signal energizes the vent relay coil 212, thereby causing the vent relay contacts 214 to close. Closure of the vent relay contacts 214 closes the power circuit through the vent 16c, thereby activating the vent 16c.

The sensor circuit 22 includes a soil sensor 216, a temperature sensor 218, and a current sensor 220. The soil sensor 216 is coupled to the SOIL SENSOR input of the microcontroller U1 through a conditioning circuit 222. The temperature sensor 218 is coupled the TEMP input of the microcontroller U1 through a conditioning circuit 224. The current sensor 220 is coupled to the ISENSE input of the microcontroller U1 through a conditioning circuit 226.

In general, the soil sensor 216 and the corresponding conditioning circuit 222 cooperate to generate a signal that has a quality representative of a soil level which is recognizable to the microcontroller U1. The microcontroller U1 may employ the soil sensor signals from the soil sensor 216 to alter the duration of the spray steps (e.g., steps 104–108 of FIG. 3), or to cause a repetition of one or more steps of the wash cycle.

The temperature sensor 218 and the corresponding conditioning circuit 224 cooperate to generate a signal that has a quality representative of the water temperature which is recognizable to the microcontroller U1. The microcontroller U1 controls the operation of the heater relay K2 based on the water temperature signal.

The current sensor 220 and the corresponding conditioning circuit 226 cooperate to generate a signal that has a quality representative of a current level in the run winding 19a of the motor 16a. In accordance with one aspect of the present invention, the microcontroller U1 uses the current level in the run winding 19a of the motor 16a to determine whether or not to energize or de-energize one or more start windings 19b and/or 19c in the motor. As is known in the art, it is advantageous to energize an additional start winding in a motor when starting the motor. After the motor achieves its steady state speed, the additional start winding need no longer be energized.

To this end, the microcontroller U1 processes the current sense signals received at its ISENSE input and controllably energizes or de-energizes one of two start windings of the motor 16a. Referring to the motor start circuit 20 and FIG. 7, the microcontroller U1 includes a CCW output and a CW output that are coupled to the motor start circuit 20. The CCW output is coupled through a driver transistor Q230 to the control input of a triac switch Q231. The triac switch Q231 is operably coupled to controllably connect and disconnect the circuit through the counterclockwise winding 19c of the motor 16a. (See FIG. 2). To this end, one side of the triac switch Q231 is coupled to the motor neutral line, and the other is configured to be coupled to the counterclockwise winding 19c. (See FIG. 2). In an analogous manner, the CW output is coupled through a driver transistor Q240 to a triac switch Q241. One side of the triac switch Q241 is coupled to the motor neutral line and the other side is configured to be coupled to the clockwise winding 19b of the motor 16a. (See FIG. 2).

Referring again generally to the sensor circuit 22, the current sensor 220 in the exemplary embodiment described herein is a relatively low resistance shunt resistor. In the embodiment of FIG. 7, the shunt resistor 220 has a resistance value of about 0.045 ohms. In accordance with one aspect of the present invention, the shunt resistor 220 is formed as an etched path on the primary PCB 62.

Figure 10:
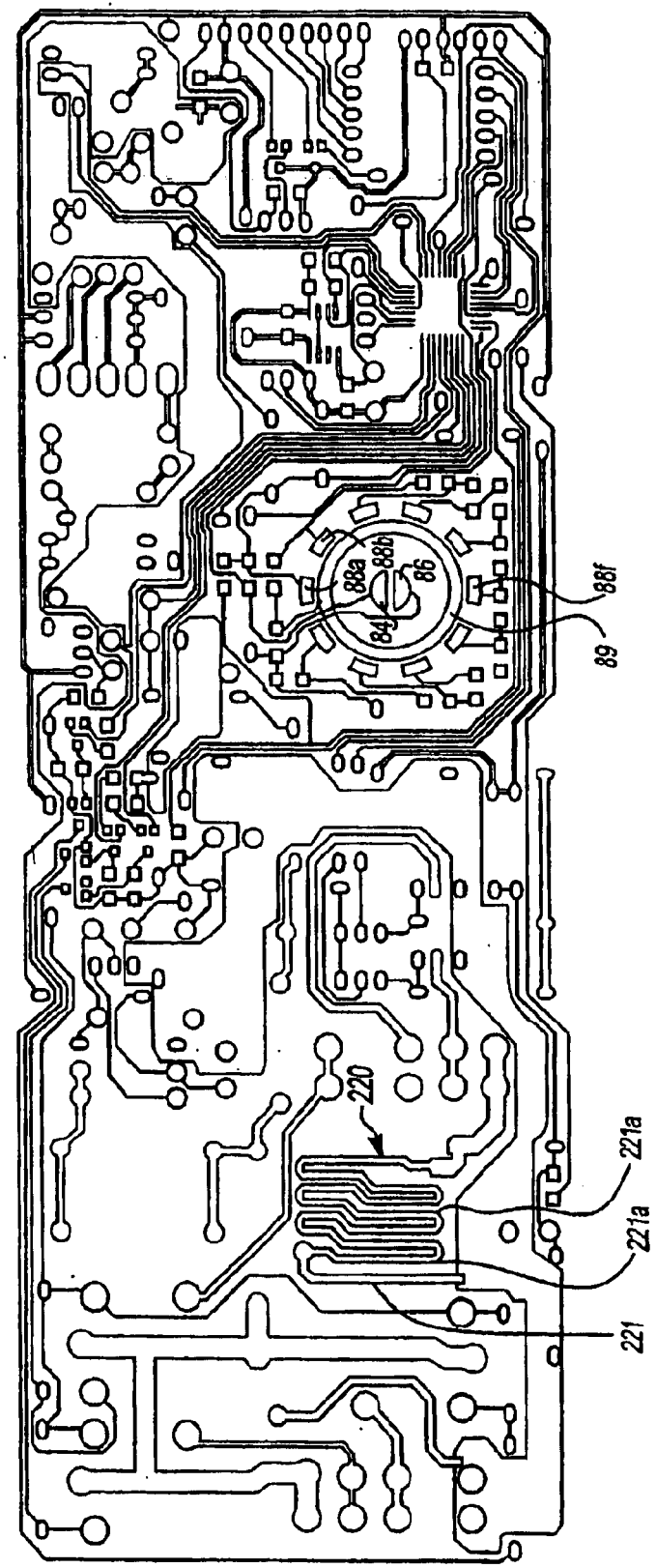
FIG. 10 shows a diagram of an exemplary trace layout of a circuit board in accordance with the present invention.

In particular, FIG. 10 shows an exemplary trace layout of the PCB 62. FIG. 10 shows the primary PCB 62 in its unpopulated state. When populated, the various elements illustrated in FIGS. 7 and 8 of the control circuit 10 are mounted on the primary PCB 62. The traces on the primary PCB 62 connect the various elements mounted on the PCB 62.

As indicated above, however, the current sensor 220 is not a separate device that is mounted on the primary PCB 62, but instead is formed by one of the traces. For example, in FIG. 10, the current sensor 220 is a trace 221 having a geometry, primarily its length and width, configured to create a resistance of about 0.045 ohms. The width must be sufficient to carry the current of the run winding 19a of the motor 16a. In the embodiment described herein, the trace of the current sensor 220 includes a plurality of switch backs 221a in order to obtain the desired length within a confined area of the circuit board surface. However, it will be appreciated that other trace geometries may be used and still obtain many of the benefits of the present invention. FIG. 10 further shows traces that constitute the switch contacts 88a through 88j as well as contact 89.

The incorporation of the current sensor 220 as a trace on the PCB 62 helps reduce overall cost. Prior art current sensing resistors having a resistance of less than one ohm often have consisted of coiled wires that were costly to both manufacture and assemble onto the circuit board. The use of the trace as the current sensor 220 incurs relatively little cost, and conductive traces are well-suited for small resistance values.

Referring again to FIG. 8, the current sensor 220 is adapted to be coupled to a measurement point 228, which in turn is adapted to be coupled to the run winding of the motor. The current sensor 220 is coupled on the other side to motor neutral. As a result, the current sensor 220 represents a very low resistive path from the run winding to ground, thereby forming the shunt. The ISENSE input of the microcontroller U1 is then coupled to the measurement point 228 through series resistors R32 (10 k-ohms) and R220 (10 k-ohms). A biasing resistor R33 (59 k-ohms) and a protection diode D221 are coupled between the junction of the two resistors R32 and R220 and a bias voltage. A capacitor C220 (0.01 microfarads) is coupled between the junction of the two resistors R32 and R220 and ground.

In general, the current flowing through the run winding 19a of the motor 16a is shunted to ground almost entirely through the current sensor 220 because any other path runs through the much more resistive resistor R220. However, it is noted that an alternative path through a diode D220 is provided should the current sensor 220 become open circuited. Nevertheless, under normal circumstances, the voltage measured at the reference point 228 divided by the resistance of the current sensor 220 provides an approximation of the run winding current. The voltage signal at the reference point 228 is provided to the ISENSE input through the conditioning circuit 226 formed by the resistors R32, R220, R33, diodes D221, 220 and the capacitor C220. Thus, the voltage signal at the ISENSE input is representative of the current flowing in the run winding 19a of the motor 16a. Configured as described above, the signal at the ISENSE input has a waveform that tracks the waveform of the run winding current waveform.

The microcontroller U1 may then use that ISENSE signal waveform to control various aspects of the dishwasher. As discussed below, the microcontroller U1 determines whether and when to energize and de-energize the start winding 19b or 19c of the motor 16a based on the magnitude of the run winding current. In general, when the motor 16a starts, the run winding current tends to be relatively high. As a result, the ISENSE signal will likewise have a relatively high magnitude. The microcontroller U1 is programmed to cause the start winding 19b or 19c to be energized when the ISENSE signal has a relatively high magnitude. After the motor 16a reaches its running speed, the current through the run winding 19a drops. Accordingly, the microcontroller U1 causes the start winding 19b or 19c to be de-energized when the magnitude of the ISENSE signal falls below a certain threshold.

In addition, the microcontroller U1 may determine whether to open the water valve to adjust the water level in the tub 54 based at least in part on the phase of the run winding current, which may also be detected from the ISENSE signal waveform.

Referring specifically to the control of the start windings, an exemplary operation in which the microcontroller U1 starts the motor, for example, to begin the spray operation of step 104 of FIG. 3. To start the motor, the microcontroller U1 provides a signal to its MTR COMMON output and its CW output. The signal at the CW output operates to turn on the triac Q241, thereby connecting the clockwise start winding 19c to motor neutral. The signal at the MTR COMMON output causes the relay contacts 206 to connect the windings 19a and 19c of the motor 16a to a common power connection. As a result, the run winding 19a and the clockwise start winding 19c of the motor 16a are energized and the motor 16a begins to rotate in the clockwise direction. As the motor 16a begins to approach its steady state speed, the magnitude of the current in the run winding 19a (and clockwise start winding 19c) will begin to decrease. Thus, the magnitude of the signal at the ISENSE input of the microcontroller U1 also decreases. When the magnitude of the signal at the ISENSE input falls below a predetermined level, the microcontroller U1 removes the signal from the CW output. As a result, the triac Q241 is turned off and the clockwise start winding 19c is open-circuited. The predetermined level of ISENSE is a level that corresponds to a run winding current consistent with the motor running at or near steady state. At steady state, the motor no longer requires the start winding to be energized. Those of ordinary skill in the art may readily determine the appropriate run winding current level at which to turn off the start winding current.

The motor 16a continues to run at steady state with current only in the run winding 19a. When the microcontroller U1 stops the motor 16a, as in the completion of step 108, then the microcontroller U1 removes the signal from its MTR COMMON output. Removal of the signal from the MTR COMMON output causes the motor relay coil 204 to open the motor relay contacts 206, thereby de-energizing the run winding 19b.

The microcontroller U1 may also cause counterclockwise operation of the motor 16a, which may be used to during the water drainage steps 110 and 116 of FIG. 3, by performing the same operations as described above using its CCW output instead of the CW output.

It will be appreciated that the current sensor 220 preferably has a high degree of accuracy (i.e. tight tolerance on resistance value). In some cases, the degree of accuracy cannot be easily achieved in a low resistance resistor formed as a trace on a circuit board such as that shown by example in FIG. 10. Even relatively small error in the resistance value of the current sensor (e.g. 0.049 ohms instead of 0.045 ohms) can lead to unpredictability in the control operations of the microcontroller U1. For example, consider a situation in which the microcontroller U1 ideally causes current to be removed from a start winding when the run winding current is N amps, and the nominal (ideal) resistance of the current sensor 220 is 0.045 volts. In such a situation the microcontroller U1 is programmed to cause the start winding current to be removed when the voltage drop over the current sensor 220 is N/0.045. As a result, the microcontroller U1 will cause current to be removed from the start winding when the voltage at the measurement point 228 is detected to be N/0.045 volts with respect to motor neutral. If, however, the actual resistance of the current sensor 220 is 0.049 ohms, then the run winding current will be N when the voltage at the measurement point 228 is N/0.049 volts, not N/0.045. Nevertheless, the microcontroller U1 would cause the current to be removed from the start winding when the voltage at the measurement point 228 is N/0.045 volts. When the voltage at the measurement point 228 is N/0.045 volts, the actual current magnitude is higher than N due to the error in the current sensor. Thus, the microcontroller U1 would turn off the start winding current before the desired time.

To avoid such unpredictability in operation, the microcontroller U1 may be configured to compensate for error (variation of the resistance) of the current sensor 220. To compensate for resistance error, the microcontroller U1 digitally scales the magnitude of the signal at ISENSE by the amount of the resistance error. Thus, if the actual resistance of the current sensor 220 is 0.049 ohms, then the microcontroller U1 would scale the ISENSE signal by 0.045/0.049. Thus, instead of removing the current at N/0.045, current is removed at (0.045/0.049)*N/0.045, or N/0.049. As discussed above, if the actual resistance of the current sensor 220 is 0.049 ohms, then the current is N when the voltage magnitude at the measurement point 228 is N/0.049.

The percentage of resistance error may be determined any time after the etched current sensor 220 is formed, even before the primary PCB 62 is populated. The compensation factor derived from the determined error may then be stored in the EEPROM U5 (see FIG. 7) or other non-volatile memory (see generally the memory 26 of FIG. 2). By providing a programmable memory in which to store the compensation factor, the variable nature of the error arising from the use of an etched resistor is accommodated. In particular, because the resistance value is relatively low (i.e. less than one-tenth of an ohm), even small variations in the trace thickness, geometry or width can significantly alter the resistance value. Thus, the resistance error can vary as a function of manufacturing tolerances, thereby requiring custom compensation in each device. The use of a programmable memory device for storing the compensation factor allows for custom calibration of each device.

Nevertheless, if manufacturing tolerances are tightened sufficiently to eliminate the need for compensation, then the requirement of using a compensation factor can be eliminated altogether.

The actuator circuit 18 includes a valve actuator circuit 230 and a detergent/rinse aid actuator circuit 232. The valve actuator circuit 230 includes a semiconductor switch Q250 that gates the water valve solenoid, not shown, to AC neutral. A VALVE CNTL output of the microcontroller U1 is connected to the control input of the switch Q250. The detergent/rinse aid actuator circuit 232 is similarly controlled through a triac Q260. In the exemplary embodiment disclosed herein, the detergent dispenser release mechanism is coupled through a first diode D260 and the rinse-aid dispenser is coupled through a second diode D261. The second diode D261 is reverse biased with respect to the first diode D260. So configured, if the microcontroller U1 only energizes the triac Q260 during positive half cycles of the line voltage, then only the rinse aid dispenser is actuated. Similarly, if the microcontroller U1 only energizes the triac Q260 during negative half cycles of the line voltage, then only the detergent dispenser is actuated. In this manner, two separate devices may be independently controlled using a single microcontroller output and a single semiconductor switch.

FIG. 9 shows a schematic diagram of the portion of the exemplary control circuit that includes the optical I/O circuit 14. The optical I/O circuit 14 includes the plurality of indicator lights 36a through 36i which in the exemplary embodiment described herein are light emitting diodes ("LEDs"). The optical I/O circuit 14 further includes an optical detector device 37 in the form of a detector LED.

In general, the indicator lights 36a through 36i are operably connected to the microcontroller U1. The microcontroller U1 controllably energizes the indicator lights 36a through 36i at select times during the operation of the dishwasher. In particular, the microcontroller U1 controllable energizes the indicator lights 36a through 36i as described below.

The indicator light 36a is energized and thus lit when and if the "Hi-Temp Wash" option is selected by the operator (see FIG. 3, above). The microcontroller U1 similarly energizes the indicator light 36b when and if the "Air Dry" option is selected by the operator (see FIG. 3, above). The microcontroller U1 likewise energizes the indicator light 36c when and if the "2 Hour Delay" option is selected by the operator (see FIG. 3, above). The microcontroller U1 controllable energizes the indicator light 36d when and if the "4 Hour Delay" option is selected by the operator (see FIG. 3, above). The microcontroller U1 further controllably energizes the indicator lights 36e through 36i during steps of the flow diagram 100 (see FIG. 3, above) that correspond to the indicia located adjacent to the lights 36e through 36i.

In the exemplary embodiment described herein, the indicator lights 36a through 36i are connected to the microcontroller U1 in the manner described below. A first LED driver transistor Q1 is connected between a microcontroller output L1 and the anodes of each of the indicator lights 36a through 36e. A second LED driver transistor Q2 is connected between a microcontroller output L2 and the anodes of each of the indicator lights 36f through 36i. The cathodes of indicator lights 36a and 36f are coupled through a 220 ohm resistor R18 to an A1 output of the microcontroller U1. The cathodes of indicator lights 36b and 36g are coupled through a 220 ohm resistor R47 to an A2 output of the microcontroller U1. The cathodes of indicator lights 36c and 36h are coupled through a 220 ohm resistor R45 to an A3 output of the microcontroller U1. The cathodes of indicator lights 36d and 36i are coupled through a 220 ohm resistor R6 to an A4 output of the microcontroller U1. The cathode of indicator light 36e is coupled through a 220 ohm resistor R36 to an A5 output of the microcontroller U1.

Accordingly, the microcontroller energizes each indicator light 36x by providing an output signal on a unique combination of either L1 or L2 and one of A1, A2, A3, A4 and A5. For example, to energize the indicator light 36h, the microcontroller energizes both L2 and A3.

In accordance with one aspect of the present invention, the optical I/O circuit 14 further includes optical communication devices that are operable to effectuate communication between the microcontroller U1 and an external processing device. Preferably, at least one of the optical communication devices is one of the indicator lights 36a through 36i. As such, the overall number of optical devices may be reduced by employing at least one as both an indicator light and an optical communication device.

In the exemplary embodiment described herein, the indicator light 36i also operates as a first optical communication device, and the optical detector 37 constitutes a second optical communication device. As discussed above, in connection with FIG. 4, the indicator light 36i is located adjacent to the optical detector 37.

The optical detector 37 is coupled through an amplifier transistor Q3 to an RX input of the microcontroller U1. In particular, the anode of the optical detector 37 is connected to the base of the transistor Q3, which is an NPN bipolar junction transistor. The cathode of the optical detector 37 is coupled to a bias voltage supply (−5V). A 220 k-ohm bias transistor R2 is further coupled between the bias voltage supply and the base of the transistor Q3. The collector of the transistor Q3 is coupled to ground through a 47 k-ohm bias resistor R3. The RX input of the microcontroller U1 is coupled to the collector of the transistor Q3. The collector of the transistor Q3 is coupled to the bias voltage supply (−5V).

In the exemplary embodiment described herein, the indicator lights 36a through 36i, the optical detector 37, the resistor R2 and the amplifier transistor Q3 are disposed on the secondary PCB 64. All other elements are disposed on the primary PCB 62. (See FIGS. 5 and 6).

In operation, the indicator light 36i functions as an transmitter and the optical detector 37 functions as an optical receiver. For transmission of data signals, the microcontroller U1 provides control signals at its L2 and A4 output in accordance with the data to be transmitted. The indicator light 36i lights or energizes in response to the control signals to optically communicate the data external to the control panel 52 of the dishwasher 50. For reception of data signals, the optical detector 37 receives light/optical signals from an external device through the control panel 52. The optical signals "turn on" the optical detector 37, thereby turning on the transistor Q3. When the transistor Q3 is turned on, the voltage at RX drops significantly. The microcontroller U1 thus detects the reception of light signals through voltage changes at the input RX.

The optical communication devices 36i and 37 of the control circuit 10 communicate optically with similar devices that are electrically connected to an external processing device. The external processing device may be a diagnostics tool that includes one or more digital processing circuits. A diagnostics tool may use the optical communication devices 36i and 37 to obtain diagnostic or other information from the microcontroller U1 that may be useful in assessing the performance of the dishwasher and/or diagnosing the source of a malfunction.

Figure 11:
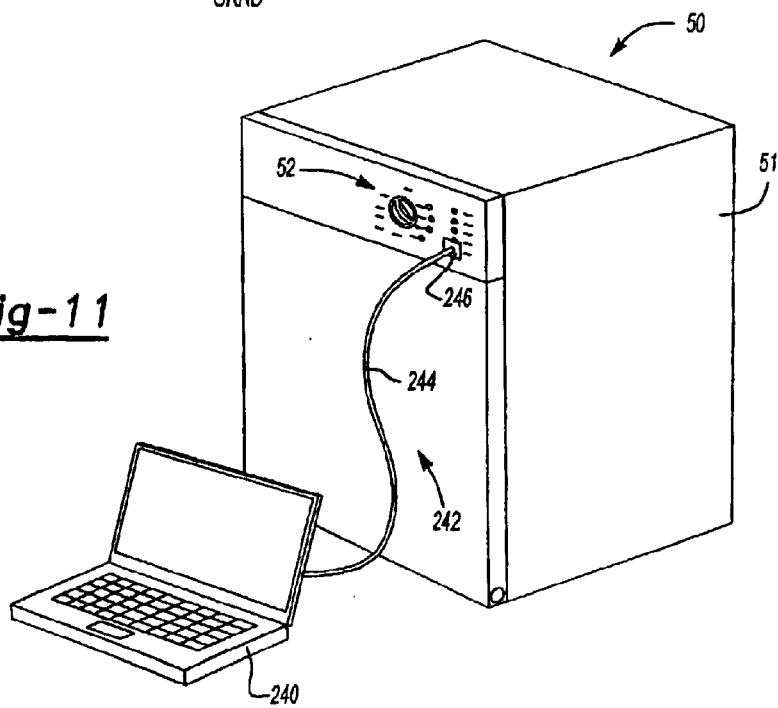
FIG. 11 shows an exemplary arrangement in which a diagnostic tool is configured to communicate with a control circuit of the dishwasher of FIG. 1.

FIG. 11 shows an exemplary arrangement in which an exemplary diagnostics tool 240 is configured to obtain information from the microcontroller U1 through the communication devices 36i and 37. In particular, a connector 242 is attached to the diagnostics tool 240 and is configured to effectuate communications with the microcontroller U1 through the communication devices 36i and 37. To this end, the connector 242 includes a length of conductors 244 and a terminal 246.

Figure 12:
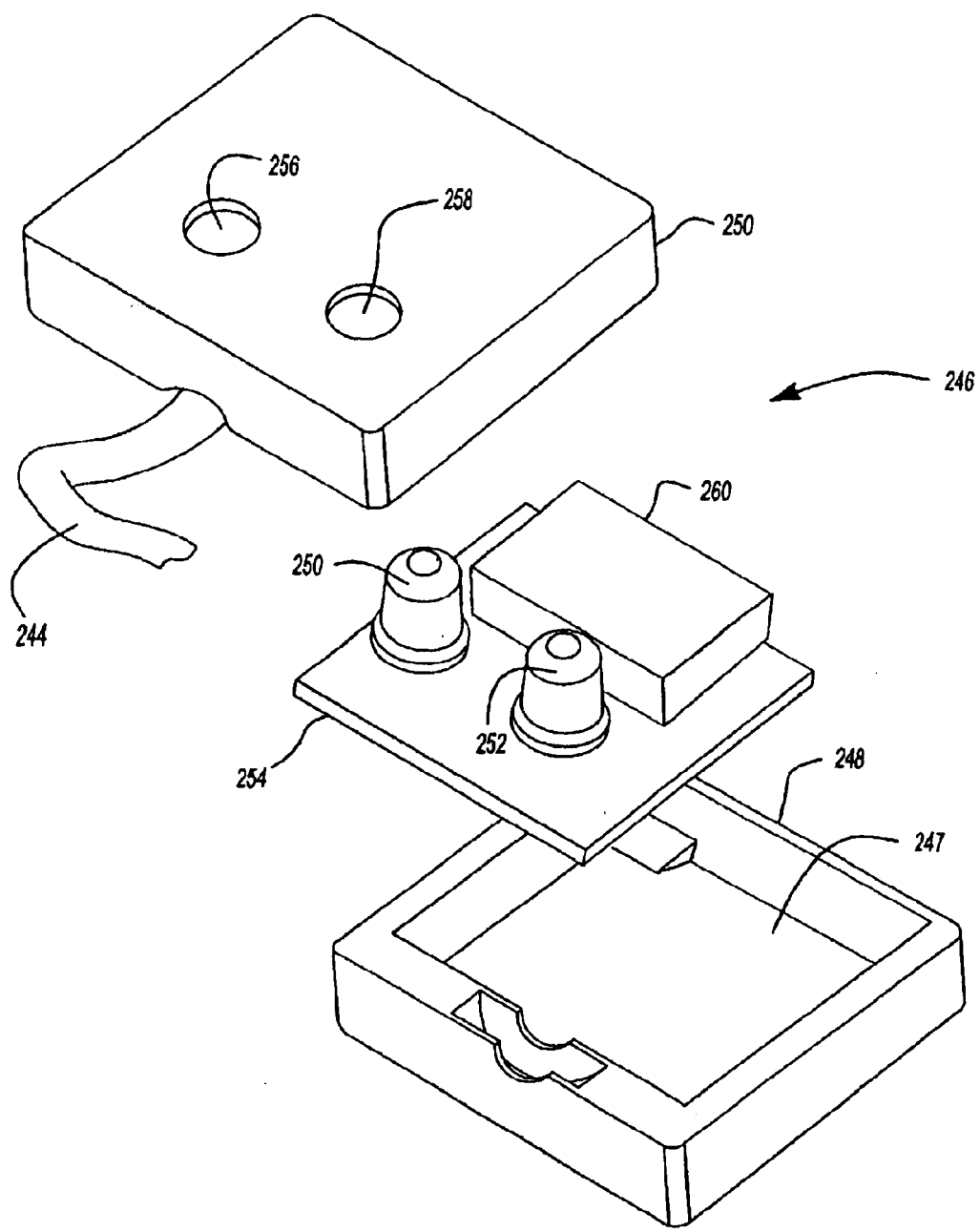
FIG. 12 shows an exploded view of a terminal of a connector of the diagnostic tool of FIG. 11.

FIG. 12 shows an exploded view of an exemplary embodiment of the terminal 246 in further detail. The terminal 246 includes a housing having an interior 247 formed by a back member 248 and a front member 250. The terminal 246 further includes first and second communication devices 250 and 252 mounted in the housing via a support 254. The support 254 is secured within the interior 247. The front member 250 includes apertures 256 and 258 through which optical communication via the first and second communications devices 250 and 252 with elements external to the housing may occur. To this end, the apertures 256 and 258 may be completely open, or may include a substantially transparent (or otherwise optically transmissive) element.

The terminal 246 further includes a mounting means 260 operable to removably secure the terminal 246 in a position with respect to the dishwasher 50 such that the first and second communication devices 250 and 252 are in optical communication with the communication devices 36i and 37 of the control circuit 10. In the exemplary embodiment described herein, the mounting means 260 is a permanent magnet disposed within and thus secured to the housing. The permanent magnet holds by magnetic force the terminal 246 to the control panel 52 as a result of the metal content dishwasher frame 51.

In operation, the user merely aligns the optical devices 250 and 252 over the communication devices 36i and 37, respectively, and then advances the terminal toward the control panel 52 until the magnetic force secures the terminal 246 in place. If some misalignment occurs, the user may slide the terminal 246 in any direction along the control panel 51 until the diagnostic tool 240 and the microcontroller U1 establish communications, signifying that the optical devices 248 and 250 are sufficiently aligned with the communication devices 36i and 37.

It will be appreciated that other mounting means may be used. For example, mechanical mounting means may be disposed on the terminal 246 that coordinates with mechanical features of the of the dishwasher frame 51 to align the optical communication devices. Indeed, the mere shape of the exemplary terminal 246 shown in FIG. 12 may constitute sufficient mounting means if corresponding alignment supports are disposed on the dishwasher control panel 52. However, the use of a magnetic mounting means provides the added advantage of not requiring any special mechanical features on the dishwasher frame 51.

Figure 13:
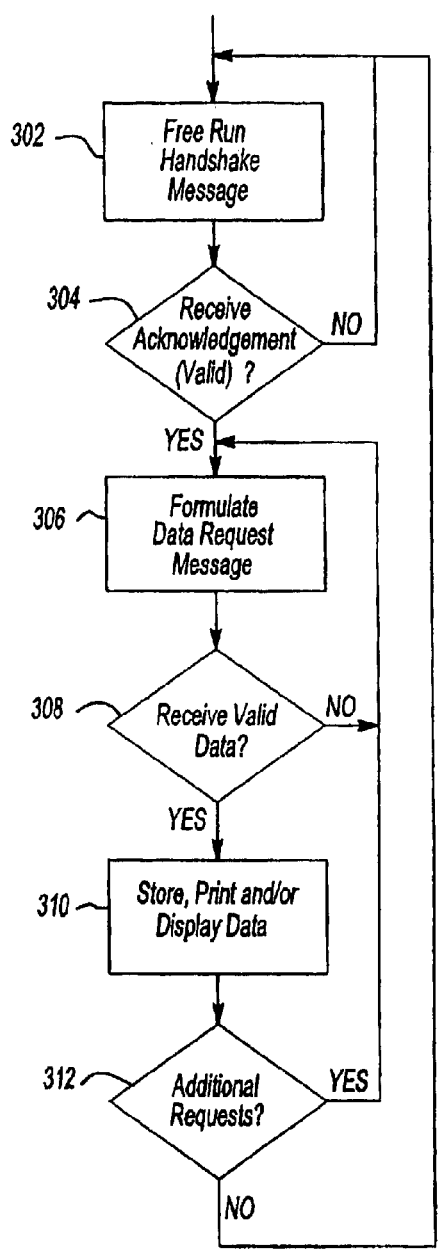
FIG. 13 shows a flow diagram of an exemplary set of operations of the diagnostic tool of FIG. 11.
Figure 14:
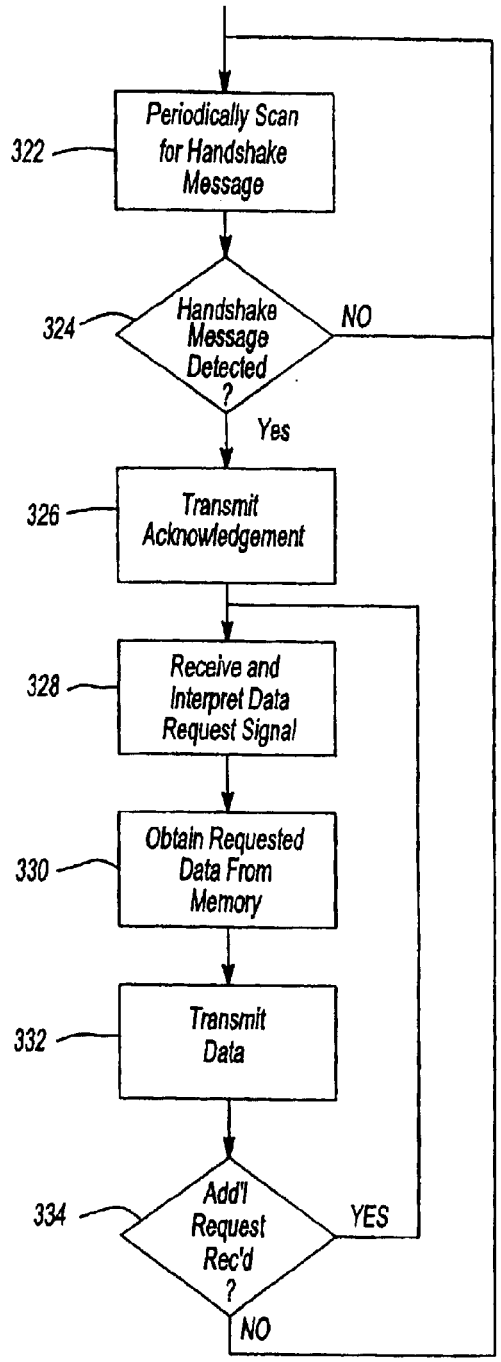
FIG. 14 shows a flow diagram of an exemplary set of operations of the controller of the dishwasher circuit of FIG. 2 in communication with the diagnostic tool of FIG. 11.

FIGS. 13 and 14 show exemplary flow diagrams of operations carried out in a typical communication operation between the diagnostics tool 240 and the microcontroller U1. FIG. 13 shows the operations of the diagnostic tool 240 and FIG. 14 shows the corresponding operations of the microcontroller U1.

Referring to FIG. 13, the diagnostic tool 240 in the embodiment described herein begins communication operations in step 302 by generating a handshake or "wake-up" message or signal pattern on a free-ran, repeating basis. Step 302 is repeated until an acknowledgement message or signal is received by the diagnostic tool 240, as indicated in step 304. In particular, as will be described below in connection with FIG. 14, once the microcontroller U1 of the dishwasher receives and recognizes the handshake or "wake-up" message or signal pattern, the microcontroller U1 transmits the acknowledgement back to the diagnostic tool 240.

Once the acknowledgement is received (see step 304), the diagnostic tool 240 preferably provides a visible or audible signal confirming to a human operator that communications with the appliance control circuit have been enabled. Thus, referring again to the mounting means 260 described above in connection with FIGS. 10 and 11, the technician may attempt to align the terminal 246 with the optical communication devices 36i and 37 on the control panel 52 during the execution of step 302. The technician would stop moving the terminal 246 once the visible or audible indication is received in step 304.

Thereafter, in step 306, the diagnostic tool 240 formulates a data request message. In particular, the diagnostic tool 240 may specify the type of data retrieved from the microcontroller U1. As discussed further below, the microcontroller U1 may be configured to store a variety of diagnostic or operational statistics and data. Accordingly, the diagnostic tool 240 in step 306 may request a particular subset of the data stored by the microcontroller U1. The diagnostic tool 240 may employ any number of mechanisms to allow a technician operator to specify the types of data to be retrieved from the dishwasher control circuit 10. In an alternative embodiment, the type of data retrieved from the microcontroller U1 is predetermined, thereby potentially eliminating the need for step 306.

In any event, in step 308, the diagnostic tool 240 receives data from the microcontroller U1 and determines whether it has received valid, responsive data. To this end, the diagnostic tool 240 checks for data integrity using any of a plurality of known methods, and also determines whether the received information is in the correct data protocol. If valid data is not received, then the diagnostic tool 240 may return to step 306 and retransmit the data request message. If, however, valid responsive data is received, then the diagnostic tool 240 proceeds to step 310.

In step 310, the diagnostic tool 240 may store, print and/or display information based on the received data. The diagnostic tool 240 may further process the data prior to displaying or printing, or may display or print the retrieved data directly.

In step 312, the diagnostic tool 240 determines whether any additional data is to be requested from the dishwasher control circuit 10. For example, the diagnostic tool 240 may query the technician or operator via a screen display as to whether additional data is to be requested. If additional data is to be requested, then the diagnostic tool returns to step 306. If not, then the diagnostic tool 240 has completed the communication operation. It will be appreciated that further processing, displaying and printing of the retrieved data or information derived therefrom may be accomplished after the communication operations have been completed.

FIG. 14 shows the operations of the microcontroller U1 performed in conjunction with the communication operation described in FIG. 13. First, step 322, the microcontroller U1 periodically scans the RX input for the handshake or "wake-up" signal generated by the diagnostic tool 240. Such periodic scanning may occur during normal operation of the dishwasher using normal interrupt-type processing. Because the operation of the dishwasher 50 is typically not computationally intensive, periodic scanning in step 322 may readily be carried out several times per second without degrading the performance of the dishwashing operations described above in connection with FIG. 3.

In step 324, the microcontroller U1 determines if the handshake or "wake-up" signal has been detected. If the microcontroller U1 does not recognize the handshake message during the scan of step 322, then the microcontroller U1 returns to repeat step 322 at a subsequent time. This process is repeated unless the signal is detected.

If, however, in step 324, the microcontroller U1 does recognize the appropriate handshake or "wake-up" signal, then the microcontroller U1 proceeds to step 326. In step 326, the microcontroller U1 transmits an acknowledgement signal to the diagnostic tool using the indicator light 36i.

Thereafter, in step 328, the microcontroller U1 receives the data request signal generated by the diagnostic tool 240 in step 306 of FIG. 12. The microcontroller U1 parses the message and determines the data requested. The requested diagnostic data may be stored locally within the microcontroller U1 or in the EEPROM U5. It will be appreciated that the diagnostic data typically includes data gathered and stored during the operation of the dishwasher 50.

Such data may include statistics or information regarding detected out-of-boundary conditions. For example, the microcontroller U1 may record an out-of-boundary event if the temperature sensor reaches a certain temperature, or if the temperature fails to reach a particular temperature. Other diagnostic data may include a count of the number of cycles run by the machine, the number of hours the motor 16a has operated, or similar usage information. The exact nature of the type of diagnostic information obtained, and the manner in which it is stored, will vary based on the needs and strategies of the particular implementation.

In step 330, the microcontroller U1 retrieves the requested data from the memory (e.g. internal memory or the EEPROM U5). If necessary, the microcontroller U1 processes raw data to obtain the type of data requested. Thereafter, in step 332, the microcontroller U1 transmits the retrieved data to the diagnostic tool 240 via the indicator light 36i. To this end, the microcontroller U1 configures the signal and/or data message to the format expected by the diagnostic tool 240.

In step 332, the microcontroller U1 determines whether any further data request signals are generated. If no such new requests are received before a time-out period, then the microcontroller U1 returns to step 322 to periodically monitor for a handshake or "wake-up" signal. If, however, an additional request is received in step 330, then the microcontroller U1 returns to step 328.

It will appreciated that in the alternative to step 332 of FIG. 14, the microcontroller U1 may return directly to step 322. Thus, additional requests would be handled in the same manner as the original request. In such a case, the operation of the diagnostic tool 240 in FIG. 13 may correspondingly proceed directly to step 302 from step 310. In any event, it will be appreciated that the manner in which the functions of FIGS. 13 and 14 may vary as a matter of design choice.

It will be appreciated that the above-described embodiments are merely exemplary, and that those of ordinary skill in the art may readily devise their own implementations that incorporate the principles of the present invention and fall within the spirit and scope thereof. For example, at least some of the advantages of the use of a rotating position switch and a selector switch in an appliance may be obtained even if the rotating position switch and selector switch are not combined as a single mechanical assembly. Such advantages arise from the reduction of parts for the selection of options, among other things. Likewise, at least some advantages of combining the switches into a single mechanical assembly may be obtained without incorporating the exact structure shown in FIGS. 5 and 6. Finally, the advantages of the use of the rotating position switch and selector switch may be obtained in a dishwashing (or other type of appliance unit) that does not necessarily incorporate the optical communication devices or the use of a current sense circuit that employs a PCB trace. The advantages of the switch arrangements described herein are applicable to clothes washing machines, clothes dryers, and even some cooking appliances.

In another example, at least some of the advantages of the use of a current sense circuit that employs a PCB trace may be obtained even if the current sense is used for a function other than operating a motor start circuit. Likewise, at least some of the advantages may be obtained using different circuits that obtain the current reading from the current sense resistor. In other words, the use of the current sense circuit of the present invention provides advantages in any appliance control circuit that employs a shunt resistor of very low resistance. At least one advantage is derived from the fact that the resistor is formed on a circuit board that is already a necessary element because it supports and connects other elements of the appliance control circuit. Such advantages are enjoyed regardless of the type of control switch interface employed, and regardless of the whether the optical communication circuit described above is employed.

I claim:

1. A motor control circuit comprising:
    a first winding switch having a control input, the first winding switch operable to activate a first motor winding;
    a first switch driver circuit coupled to the control input;
    a current sense circuit operably coupled to a second winding, the current sense circuit comprising a sense resistor, the sense resistor comprising an etched trace in a printed circuit board, the etched trace having a length defining a resistance of the sense resistor.

2. The motor control circuit of claim 1 wherein the first switch driver circuit is mounted on the printed circuit board.

3. The motor control circuit of claim 1 further comprising a controller, the controller operable to:
    obtain current sense signals from the current sense circuit;
    generate a first winding control signal responsive to the current sense circuit,
    provide the first winding control signal to the first switch via the first switch driver circuit.

4. The motor control circuit of claim 3 wherein the controller is secure to the printed circuit board.

5. The motor control circuit of claim 3 further comprising a memory, the memory storing a current sense compensation value, the current sense compensation value based on a difference between the resistance of the sense resistor and an ideal resistance.

6. The motor control circuit of claim 3 wherein the memory is a non-volatile memory.

7. The motor control circuit of claim 1 wherein the sense resistor comprises a shunt resistor.

8. The motor control circuit of claim 1 wherein the sense resistor has a resistance of less than one tenth of one ohm.

9. An appliance control circuit arrangement comprising:
    a current sense circuit operably coupled to a winding of an appliance motor, the current sense circuit comprising a sense resistor, the sense resistor comprising an etched trace in a printed circuit board, the etched trace having a geometry defining a resistance of the sense resistor;
    a controller operable to
        obtain current sense signals from the current sense circuit, and
        generate a first signal responsive to the current sense signals obtained from the current sense circuit.

10. The appliance control circuit of claim 9, wherein the controller is further operable to generate the first signal in the form of a control signal operable to control the operation of a device.

11. The appliance control circuit of claim 10, wherein the controller is further operable to generate the control signal such that the control signal is operable to controllably cause a start winding of the appliance motor to be energized.

12. The appliance control circuit of claim 9 wherein the controller is mounted on the printed circuit board.

13. The appliance control circuit of claim 9 further comprising a memory, the memory storing a current sense compensation value, the current sense compensation value based on a difference between the resistance of the sense resistor and an ideal resistance.

14. The appliance control circuit of claim 9 wherein the memory is a non-volatile memory.

15. The appliance control circuit of claim 9 wherein the sense resistor comprises a shunt resistor.

16. The appliance control circuit of claim 9 wherein the sense resistor has a resistance of less than one tenth of one ohm.

17. A method comprising:
    a) providing a motor winding current to a first trace on a printed circuit board, the first trace having a resistance;
    b) generating a sense signal representative of the voltage across the first trace;
    c) controlling the operation of a device within an appliance based on the sense signal.

18. The method of claim 17 wherein c) further comprises controlling the operation of a motor within the appliance.

19. The method of claim 18 wherein b) further comprises generating the sense signal using a controller.

20. The method of claim 19 further comprising disposing the controller on the printed circuit board.

* * * * *